US009019381B2

(12) United States Patent
Guler et al.

(10) Patent No.: US 9,019,381 B2
(45) Date of Patent: Apr. 28, 2015

(54) VIDEO TRACKING SYSTEMS AND METHODS EMPLOYING COGNITIVE VISION

(75) Inventors: Sadiye Zeyno Guler, Winchester, MA (US); Jason Adam Silverstein, Wilmington, MA (US); Matthew Kevin Farrow, Canton, MA (US); Ian Harris Pushee, Ayer, MA (US)

(73) Assignee: IntuVision Inc., Winchester, MA (US)

( * ) Notice: Subject to any disclaimer, the term of this patent is extended or adjusted under 35 U.S.C. 154(b) by 1377 days.

(21) Appl. No.: 12/387,968

(22) Filed: May 9, 2009

(65) Prior Publication Data

US 2009/0315996 A1 Dec. 24, 2009

Related U.S. Application Data

(60) Provisional application No. 61/127,013, filed on May 9, 2008.

(51) Int. Cl.
| | | |
|---|---|---|
| *H04N 5/225* | (2006.01) | |
| *G08B 13/196* | (2006.01) | |
| *G06K 9/00* | (2006.01) | |
| *G06K 9/32* | (2006.01) | |
| *G01S 3/786* | (2006.01) | |

(52) U.S. Cl.
CPC .......... *G08B 13/196* (2013.01); *G06K 9/00771* (2013.01); *G08B 13/19608* (2013.01); *G06K 9/3241* (2013.01); *G08B 13/19652* (2013.01); *G01S 3/7864* (2013.01)

(58) Field of Classification Search
CPC ............. G06K 9/00771; G06K 9/3241; G08B 13/19608; G08B 13/19652
USPC ......................................... 348/155, 169–172
See application file for complete search history.

(56) References Cited

U.S. PATENT DOCUMENTS

| | | | |
|---|---|---|---|
| 6,304,674 B1 | 10/2001 | Cass et al. ...................... 382/224 |
| 6,570,608 B1 | 5/2003 | Tserng .......................... 348/143 |
| 6,731,799 B1 * | 5/2004 | Sun et al. ...................... 382/173 |
| 6,757,571 B1 * | 6/2004 | Toyama .......................... 700/47 |
| 6,812,835 B2 * | 11/2004 | Ito et al. ......................... 340/541 |
| 6,879,709 B2 | 4/2005 | Tian et al. ...................... 382/118 |
| 6,999,004 B2 | 2/2006 | Comaniciu et al. ........... 340/937 |
| 6,999,600 B2 | 2/2006 | Venetianer et al. ........... 382/103 |
| 7,006,950 B1 | 2/2006 | Greiffenhagen et al. ......... 703/2 |
| 7,072,494 B2 | 7/2006 | Georgescu et al. ........... 382/103 |
| 7,076,102 B2 | 7/2006 | Lin et al. ....................... 382/218 |
| 7,212,663 B2 | 5/2007 | Tomasi ......................... 382/154 |
| 7,336,296 B2 | 2/2008 | Brown et al. ................. 348/139 |

(Continued)

OTHER PUBLICATIONS

J. Shi, et al. "Good features to track," IEEE Conference CVPR pp. 593-600, 1994.

(Continued)

*Primary Examiner* — David Lazaro
(74) *Attorney, Agent, or Firm* — Ivan David Zitkovsky

(57) ABSTRACT

Video tracking systems and methods include a peripheral master tracking process integrated with one or more tunnel tracking processes. The video tracking systems and methods utilize video data to detect and/or track separately several stationary or moving objects in a manner of tunnel vision. The video tracking system includes a master peripheral tracker for monitoring a scene and detecting an object, and a first tunnel tracker initiated by the master peripheral tracker, wherein the first tunnel tracker is dedicated to track one detected object.

41 Claims, 16 Drawing Sheets

(56) References Cited

U.S. PATENT DOCUMENTS

| | | | |
|---|---|---|---|
| 7,391,907 B1 | 6/2008 | Venetianer et al. | 382/224 |
| 7,409,076 B2 | 8/2008 | Brown et al. | 382/103 |
| 7,436,980 B2 | 10/2008 | Sigal et al. | 382/103 |
| 7,447,331 B2 | 11/2008 | Brown et al. | 382/103 |
| 7,480,414 B2 | 1/2009 | Brown et al. | 382/224 |
| 7,620,266 B2 | 11/2009 | Brown et al. | 382/278 |
| 7,688,349 B2 | 3/2010 | Flickner et al. | 348/150 |
| 7,747,075 B2 | 6/2010 | Tian et al. | 382/173 |
| 7,764,736 B2 | 7/2010 | Comaniciu et al. | 375/240.08 |
| 7,764,808 B2 | 7/2010 | Zhu et al. | 382/104 |
| 7,796,154 B2 | 9/2010 | Senior et al. | 348/154 |
| 7,853,042 B2* | 12/2010 | Parameswaran et al. | 382/103 |
| 2004/0105570 A1 | 6/2004 | Venetianer et al. | 382/100 |
| 2004/0113933 A1* | 6/2004 | Guler | 345/716 |
| 2004/0126014 A1 | 7/2004 | Lipton et al. | 382/173 |
| 2004/0131249 A1 | 7/2004 | Sandrew | 2/162 |
| 2004/0151342 A1 | 8/2004 | Venetianer et al. | 382/103 |
| 2004/0258152 A1* | 12/2004 | Herz | 375/240.16 |
| 2005/0104958 A1 | 5/2005 | Egnal et al. | 348/143 |
| 2005/0134685 A1 | 6/2005 | Egnal et al. | 348/157 |
| 2005/0146605 A1 | 7/2005 | Lipton et al. | 348/143 |
| 2005/0162515 A1 | 7/2005 | Venetianer et al. | 348/143 |
| 2005/0168574 A1 | 8/2005 | Lipton et al. | 348/143 |
| 2005/0232462 A1 | 10/2005 | Vallone et al. | 382/103 |
| 2005/0259846 A1 | 11/2005 | Freeman et al. | 382/103 |
| 2005/0271250 A1 | 12/2005 | Vallone et al. | 382/103 |
| 2005/0271280 A1 | 12/2005 | Farmer et al. | 382/224 |
| 2006/0050953 A1 | 3/2006 | Farmer et al. | 382/159 |
| 2006/0066719 A1 | 3/2006 | Haering et al. | 348/143 |
| 2006/0066722 A1 | 3/2006 | Yin et al. | 348/143 |
| 2006/0072010 A1 | 4/2006 | Haering et al. | 348/143 |
| 2006/0092280 A1* | 5/2006 | Kamijo et al. | 348/169 |
| 2006/0204036 A1* | 9/2006 | Huang | 382/103 |
| 2006/0215880 A1 | 9/2006 | Berthilsson et al. | 382/103 |
| 2006/0222209 A1 | 10/2006 | Zhang et al. | 382/107 |
| 2006/0232673 A1 | 10/2006 | Lipton et al. | 348/155 |
| 2006/0239506 A1 | 10/2006 | Zhang et al. | 382/103 |
| 2006/0262958 A1 | 11/2006 | Yin et al. | 382/103 |
| 2006/0268111 A1 | 11/2006 | Zhang et al. | 348/169 |
| 2006/0291694 A1 | 12/2006 | Venetianer et al. | 382/103 |
| 2006/0291695 A1 | 12/2006 | Lipton et al. | 382/103 |
| 2007/0002141 A1 | 1/2007 | Lipton et al. | 348/155 |
| 2007/0013776 A1 | 1/2007 | Venetianer et al. | 348/143 |
| 2007/0025593 A1 | 2/2007 | Haupt et al. | 382/103 |
| 2007/0058040 A1 | 3/2007 | Zhang et al. | 348/143 |
| 2007/0058842 A1 | 3/2007 | Vallone et al. | 382/115 |
| 2007/0061696 A1 | 3/2007 | Vallone et al. | 715/255 |
| 2007/0085710 A1 | 4/2007 | Bousquet et al. | 341/50 |
| 2007/0085711 A1 | 4/2007 | Bousquet et al. | 341/50 |
| 2007/0127774 A1 | 6/2007 | Zhang et al. | 382/103 |
| 2007/0160289 A1 | 7/2007 | Lipton et al. | 382/173 |
| 2007/0285510 A1 | 12/2007 | Lipton et al. | 348/135 |
| 2008/0098323 A1 | 4/2008 | Vallone et al. | 715/772 |
| 2008/0100704 A1 | 5/2008 | Venetianer et al. | 348/143 |
| 2008/0106599 A1 | 5/2008 | Liu et al. | 348/143 |
| 2008/0117296 A1 | 5/2008 | Egnal et al. | 348/143 |
| 2008/0166015 A1 | 7/2008 | Haering et al. | 382/103 |
| 2008/0291278 A1 | 11/2008 | Zhang et al. | 348/159 |
| 2009/0041297 A1 | 2/2009 | Zhang et al. | 382/103 |
| 2009/0237511 A1* | 9/2009 | DeFlumere et al. | 348/164 |
| 2009/0268033 A1* | 10/2009 | Ukita | 348/169 |
| 2009/0297023 A1 | 12/2009 | Lipton et al. | 382/164 |
| 2010/0165112 A1* | 7/2010 | Scanlon et al. | 348/169 |
| 2010/0245589 A1* | 9/2010 | Sun et al. | 348/169 |

OTHER PUBLICATIONS

I. Haritaoglu, et al. "W4: Realtime Surveillance of People and Their Activities," Int. Conference on Face and Gesture Recognition, Nara Japan, Apr. 14-16, 1998, 6 pages.

B. J. Scholl, ZW Pylyshyn, and J Feldman. "What is a visual object? Evidence from target merging in multiple object tracking" Cognition 80 (1-2): 159-177 Jun. 2001.

D. Comaniciu, et al. "Real-time tracking of non-rigid objects using mean shift," IEEE Conference Computer Society Conference on Computer Vision and Pattern Recognition CVPR 2, pp. 142-149, 2000.

G. Purushothaman, et al. "Gamma-range Oscillations in Backward-masking Functions and their Putative Neural Correlates", Psychological Review, vol. 107, pp. 556-577, 2000.

S. S. Patel, et al. "Flash-lag Effect: Differential Latency, Not Postdiction", Science, vol. 290, p. 1051a., 2000.

Y. A. Ivanov, et al. "Recognition of Visual Activities and Interactions by Stochastic Parsing," IEEE Trans. Pattern Analysis and Machine Intelligence., vol. 22, No. 8, pp. 852-872, Aug. 2000.

B. G. Breitmeyer, et al. "Recent Models and Findings in Backward Visual Masking: A Comparison, Review, and Update", Perception & Psychophysics, vol. 62, pp. 1572-1595, 2000.

J. Rittscher, et al. "A probabilistic background model for tracking" ECCV 2: 336-350, 2000.

G. Purushothaman, et al. "Effect of Exposure Duration, Contrast and Base Blur on Coding and Discrimination of Edges", Spatial Vision, vol. 15, pp. 341-376, 2002.

G. Purushothaman, et al. "Suprathreshold Intrinsic Dynamics of the Human Visual System", Neural Computation, vol. 15: 2883-2908, 2003.

H. Ogmen, et al. "The What and Where in Visual Masking", Vision Research, vol. 43, pp. 1337-1350, 2003.

S. Hongeng, et al. "Video-Based Event Recognition: Activity Representation and Probabilistic Recognition Methods", Computer Vision and Image Understanding. vol. 96, pp. 129-162, 2004.

H. E. Bedell, et al. "Color and Motion: Which is the Tortoise and which is the Hare?", Vision Research, vol. 43, pp. 2403-2412, 2003.

H. Ogmen, et al. "Differential Latencies and the Dynamics of the Position Computation Process for Moving Targets, Assessed with the Flash-lag Effect", Vision Research, vol. 44, pp. 2109-2128, 2004.

B. G. Breitmeyer, et al. "Unconscious Priming by Color and Form: Different Processes and Levels", Consciousness and Cognition, vol. 13, pp. 138-157, 2004.

B. G. Breitmeyer, et al. "A Comparison of Masking by Visual and Transcranial Magnetic Stimulation: Implications for the Study of Conscious and Unconscious Visual Processing", Consciousness and Cognition, vol. 13, pp. 829-43, 2004.

B. G. Breitmeyer, et al. "Unconscious Priming by Form and their Parts", Visual Cognition, vol. 12, pp. 720-736, 2005.

B. G. Breitmeyer, et al. "Meta- and Paracontrast Reveal Differences Between Contour- and Contrast-Processing Mechanisms", Vision Research, vol. 46, pp. 2645-2658, 2006.

S. Guler et al. ,"Abandoned Object Detection in Crowded Places", IEEE International Workshop on Performance Evaluation in Tracking and Surveillance (PETS '06) NewYork, NY, USA, ), pp. 99-106, 2006.

S Guler et al. "Stationary Objects in Multiple Object Tracking," Sep. 5-7, 2007 IEEE Conference on Advanced Video and Signal Based Surveillance, AVSS, pp. 248-253, Sep. 2007.

Y. L. Tian, et al. "Robust and Efficient Foreground Analysis for Real-time Video Surveillance," Proceedings of the IEEE Computer Society Conference on Computer Vision and Pattern Recognition (CVPR '05)—vol. 1, 2005.

A Yilmaz, X Li, M Shah. "Object contour tracking using level sets," Asian Conference on Computer Vision, ACCV 2004, Jaju Islands, Korea 7 pages, 2004.

C. Stauffer et al, "Learning Patterns of Activity Using Real-time tracking", IEEE Trans. Pattern. Anal. Mach. Intell. vol. 22, pp. 831-843, Aug. 2000.

Kyungnam. Kim, et al. "Background Modeling and Subtraction by Codebook Construction" IEEE International Conference on Image Processing (ICIP) 2004.

* cited by examiner

VIDEO TRACKING SYSTEMS AND METHODS EMPLOYING COGNITIVE VISION

This application claims priority from U.S. Provisional Application 61/127,013 filed on May 9, 2008, which is incorporated by reference.

The present invention relates generally to video tracking systems and methods employing principles of cognitive vision.

BACKGROUND OF THE INVENTION

There are different video object detection systems that facilitate the detection of events and activities of interest. Many different algorithms are frame based algorithms that require object detection at each frame and establishment of a correspondence between the object detections in consecutive frames to enable tracking; i.e., the frame and correspondence based tracking algorithms. The object correspondence between frames may be achieved by prediction filtering or particle filtering applied to object motion and appearance attributes.

Many prior art methods do not perform well with video collected in uncontrolled real world scenes, where a background image with no moving object maybe hard to obtain or a robust object kernel density or a boundary contour can not be established at each frame. Hence, there is still a need for an automatic video tracking system and method capable of robust performance in real life situations.

SUMMARY OF THE INVENTION

The present invention is relates generally to video tracking systems and methods employing the principles of cognitive vision. More particularly, the video tracking systems and methods include a peripheral master tracking process integrated with one or more tunnel tracking processes.

The video tracking systems and methods utilize video data of any number of scenes, including uncontrolled real world scenes, to detect and/or track separately several stationary or moving objects in a manner of tunnel vision while tracking all moving objects in the scene and optionally provide evaluation of the object or the scene.

According to one aspect, a video tracking system includes a master peripheral tracker for monitoring a scene and detecting an object; and a first tunnel tracker initiated by the master peripheral tracker, wherein the first tunnel tracker is dedicated to track one detected object.

The video tracking system may further include a second tunnel tracker initiated by the master peripheral tracker after detecting a second object, wherein the second tunnel tracker is dedicated to track and/or analyze the second detected object. The video tracking system may further include a third tunnel tracker initiated by the master peripheral tracker after detecting a third object, wherein the third tunnel tracker is dedicated to track and/or analyze the third detected object. In general, the master peripheral tracker may initiate a large number of separate tunnel trackers dedicated to track separate objects. The individual tunnel trackers are initiated and closed depending on the evolution of the monitored scenes and number of predefined criteria.

The video tracking system may further include a digital video controller, and/or a tracker proxy for communicating with the master peripheral tracker and client applications. The master peripheral tracker may include an object detector and an object tracker. The tunnel tracker may execute a background subtraction based on an edge based tunnel tracking algorithm, or a Kernel based tunnel tracking algorithm.

According to another aspect, a video tracking method includes monitoring a scene and detecting an object using a master peripheral tracker; and initiating, by the master peripheral tracker, a first tunnel tracker dedicated to track one the detected object.

The video tracking method may further include initiating, by the master peripheral tracker, a second tunnel tracker dedicated to track a second detected object. The video tracking method may further include initiating a third tunnel tracker after detecting a third object and so forth. The master peripheral tracker may send image requests to a digital video controller. The master peripheral tracker and the digital video controller may exchange image data streams and notification messages. The master peripheral tracker may provide assembled tracking images to a tracker proxy that communicates with client applications.

According to yet another aspect, a site component for use with the video tracking system includes a master peripheral tracker and a tunnel tracker initiated by the master peripheral tracker. The master peripheral tracker is operative to interact with an image data stream. The master peripheral tracker includes logic to monitor a scene and to detect an object. The first tunnel tracker includes logic dedicated to track and analyze one said detected object.

The master peripheral tracker and the tunnel tracker may be implemented on one or several processors or different types. The processors may be in one location or may be distributed over a network including a network of video cameras. The processor may include a digital signal processor (DSP) or a graphics processing unit (GPU). For example, a processor executing master peripheral tracking may offload certain calculations to a separate DSP or a GPU. Furthermore, the tunnel tracker may be a separate DSP or a GPU.

According to yet another aspect, a server executable for use with the video tracking system includes monitoring a scene and detecting an object using a master peripheral tracker; and initiating, by the master peripheral tracker, a first tunnel tracker dedicated to track one the detected object.

According to yet another aspect, a computer program product for providing video tracking data includes monitoring a scene and detecting an object using a master peripheral tracker; and initiating by the master peripheral tracker a first tunnel tracker dedicated to track one the detected object.

The video tracking systems may include peripheral master tracking integrated with one or more tunnel tracking processes to enable multiple object tracking (MOT). This is based on a two layer video object tracking paradigm that utilizes cognition based visual attention and scanning of attention among multiple objects in a scene. The algorithm tracks several objects and activities at once, executes attention sequencing in tracking multiple objects through occlusions and interactions using "intelligent" cognitive vision and other performance characteristics.

The tracking system includes a left-behind object detection algorithm that is robust to occlusions in various crowded scenes. The left-behind object detection algorithm is based on periodic persistent region detection.

At the first layer a master tracker operating at a low level of focus detects new objects appearing in a scene and triggers on the second layer, highly focused tunnel trackers dedicated for each object. The master tracker uses consecutive frame differences to perform rough object detection at each frame and does not perform object correspondence by itself, but instead relies on abstracted correspondence information generated by the tunnel trackers. The tunnel trackers track each object in a constrained small area (halo) around the object. This layered approach will provide more efficiency in terms of both accuracy and speed by separating overall coarse tracking task of master tracker from the dedicated fine tracking of individual tunnels, managing resources similar to human's object based attention. In our proposed method, due to processing in the limited area of each tunnel more reliable identification and modeling of object features (both color and texture) can be done for accurate tracking compared to both background subtraction based and object transformation or contour based methods.

According to yet another aspect, the video tracking system and method may additionally employ frame based algorithms such as background subtraction, object transformation (kernel density), or object contour-based methodologies. The tracked object may be detected at each frame and the correspondence between the object detections in consecutive frames may be established to enable object tracking. The object correspondence between the frames may be achieved by prediction filtering or particle filtering applied to a moving object and its appearance attributes. The algorithm may perform object detection in one frame using object segmentation and boundary contour detection. After the object detection, video tracking may include either transforming the object regions, or evolving the object boundary contour frequently, using probabilistic distributions for the object regions and the background.

Aside form the benefits described above, the tunnel vision tracker presents a natural processing hierarchy for efficient mapping of tracking tasks on one or several processors, including embodiments using dedicated processors, within various software and hardware architectures. Another important benefit of the two layer, or multilayer layer tracking approach is providing a natural framework for tracking within wide view cameras with embedded high definition views or multiple camera or view environments with multiple views provided by a camera array with overlapping or non-overlapping views.

DETAILED DESCRIPTION OF AN ILLUSTRATIVE EMBODIMENT

Figure 1:
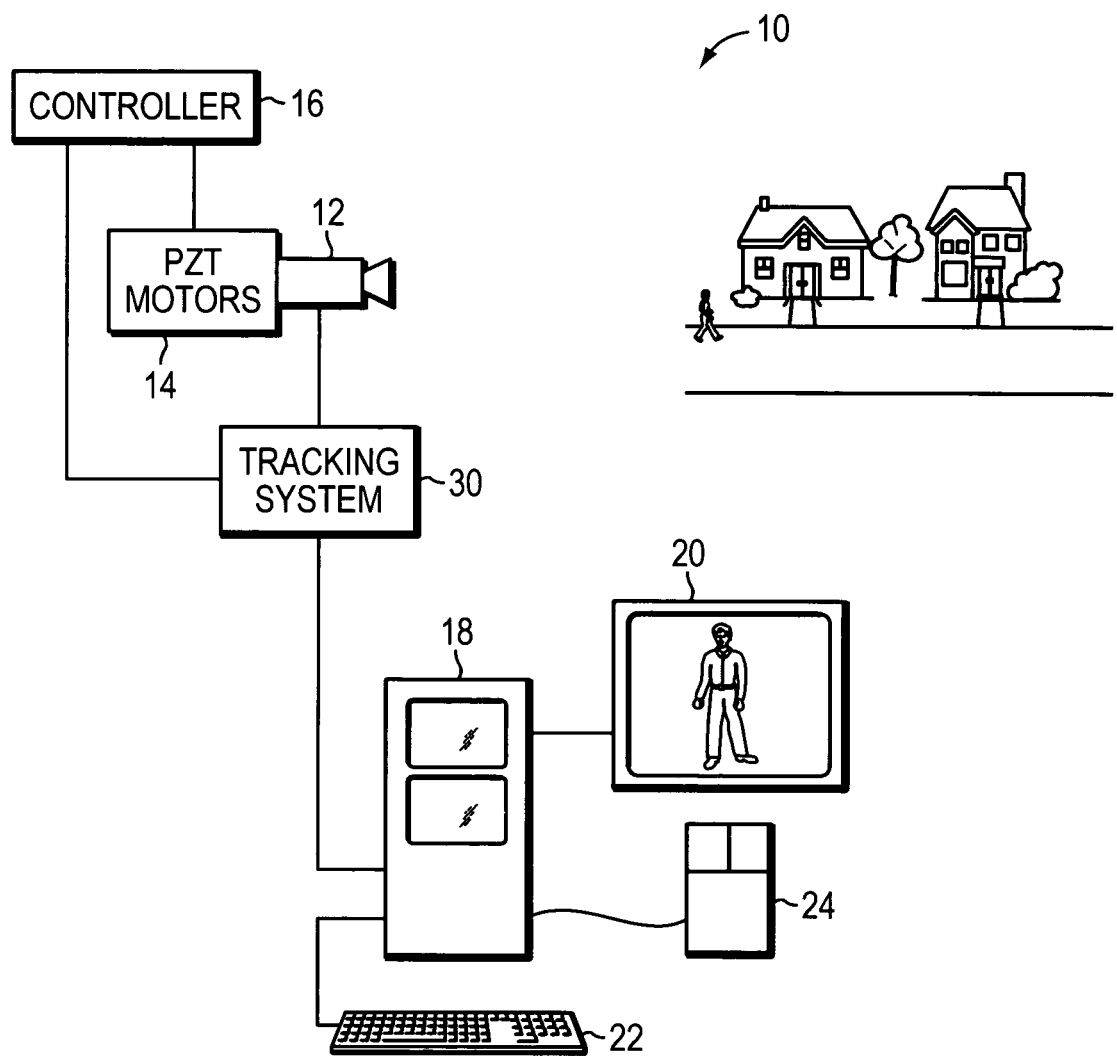
FIG. 1 illustrates schematically a video system for recording video images.

FIG. 1 illustrates schematically a video system 10 for recording video images. Video system 10 includes a camera 12 displaced by PTZ motors 14 and controlled by a controller 16. A computer 18 is connected to a computer monitor 20, keyboard 22 and a mouse 24. Tracking system 30 oversees the entire hardware operation.

Figure 2:
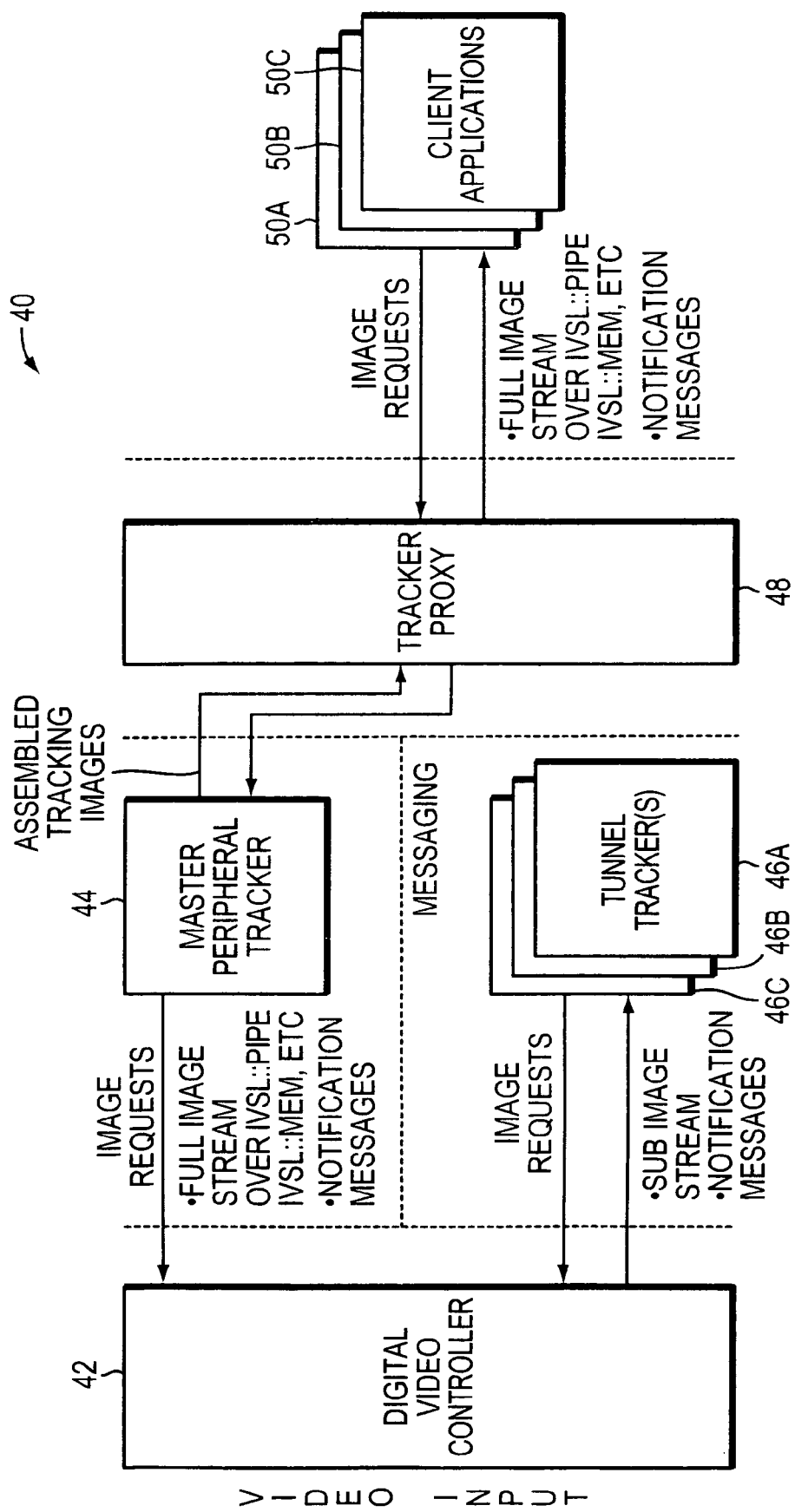
FIG. 2 illustrates diagrammatically a video tracking system.

Referring to FIG. 2, a video tracking system 40 includes a digital video controller 42, a peripheral tracker 44 (i.e., a master tracker 44), tunnel vision tracker 46 (i.e., tunnel trackers 46A, 46B, 46C . . . ), and a tracker proxy 48 communicating with client applications 50A, 50B, 50C . . . . Tracker proxy 48 may include object definitions, user configurations, and user requests received from client applications 50A, 50B, 50C. Tracker proxy 48 may be eliminated in certain embodiments. Digital video controller 42 receives a video in any one of different types of formats and holds digital images. Peripheral tracker 44 sends image requests to digital video controller 42 and receives images streams and notification messages from digital video controller 42. Peripheral tracker 44 provides assembled tracking images to tracker proxy 48, which can communicate with client applications. This function of tracker proxy 48 may be taken over by digital video controller 42 or by other elements. Tunnel vision tracker 46 sends image requests to digital video controller 42 and receives sub images streams and notification messages from digital video controller 42.

Overall, video tracking system 40, with its peripheral (master) tracker 44 and tunnel vision tracker 46 (i.e., tunnel trackers 46A, 46B, 46C . . . ) is a novel realization of the spatially-based peripheral vision and object-based focused vision in a vision and tracking system. The disclosed system tracks multiple objects preserves their spatial relationships in a scene and "understands" objects' activities and thus operates like a cognitive vision system. The video tracking system 40 allocates attention to spatial locations (space-based attention) and to "objects" (object-based attention). The video tracking system 40 efficiently allocates processing resources through "attentional mechanisms" to provide tracking and analysis of the objects in video scenes. Tunnel vision tracker 46 enables attention allocation by taking advantage of a multi layer tracking and detection paradigm. Peripheral master tracker 44 at the first layer is responsible from spatial detection and overall, general tracking of the objects in a scene and triggering of highly focused tunnel trackers (46A, 46B, 46C . . . ) dedicated to detailed analysis of the individual objects.

The video tracking system may include various embodiments of master peripheral tracker 44 and tunnel trackers 46A, 46B, 46C, . . . initiated by the master peripheral tracker. The master peripheral tracker includes logic to monitor a scene and to detect an object. The first tunnel tracker includes logic dedicated to track and analyze one said detected object. The master peripheral tracker and the tunnel tracker may be implemented on one or several processors or different types. The processors may be in one location or may be distributed over a network including a network of video cameras. The processor may include a digital signal processor (DSP) or a graphics processing unit (GPU). For example, a processor executing master peripheral tracking may offload certain calculations to a separate DSP or a GPU. Furthermore, the tunnel tracker may be a separate DSP or GPU. The processors may execute downloadable algorithms or ASICs may be designed specifically for one or several algorithms, both of which are within the meaning of the processor or the logic being programmed to execute the algorithm.

The processing may be implemented using fixed-point arithmetic or floating point arithmetic. Furthermore, multi-core implementations of DSPs or GPUs may be used.

Figure 11:
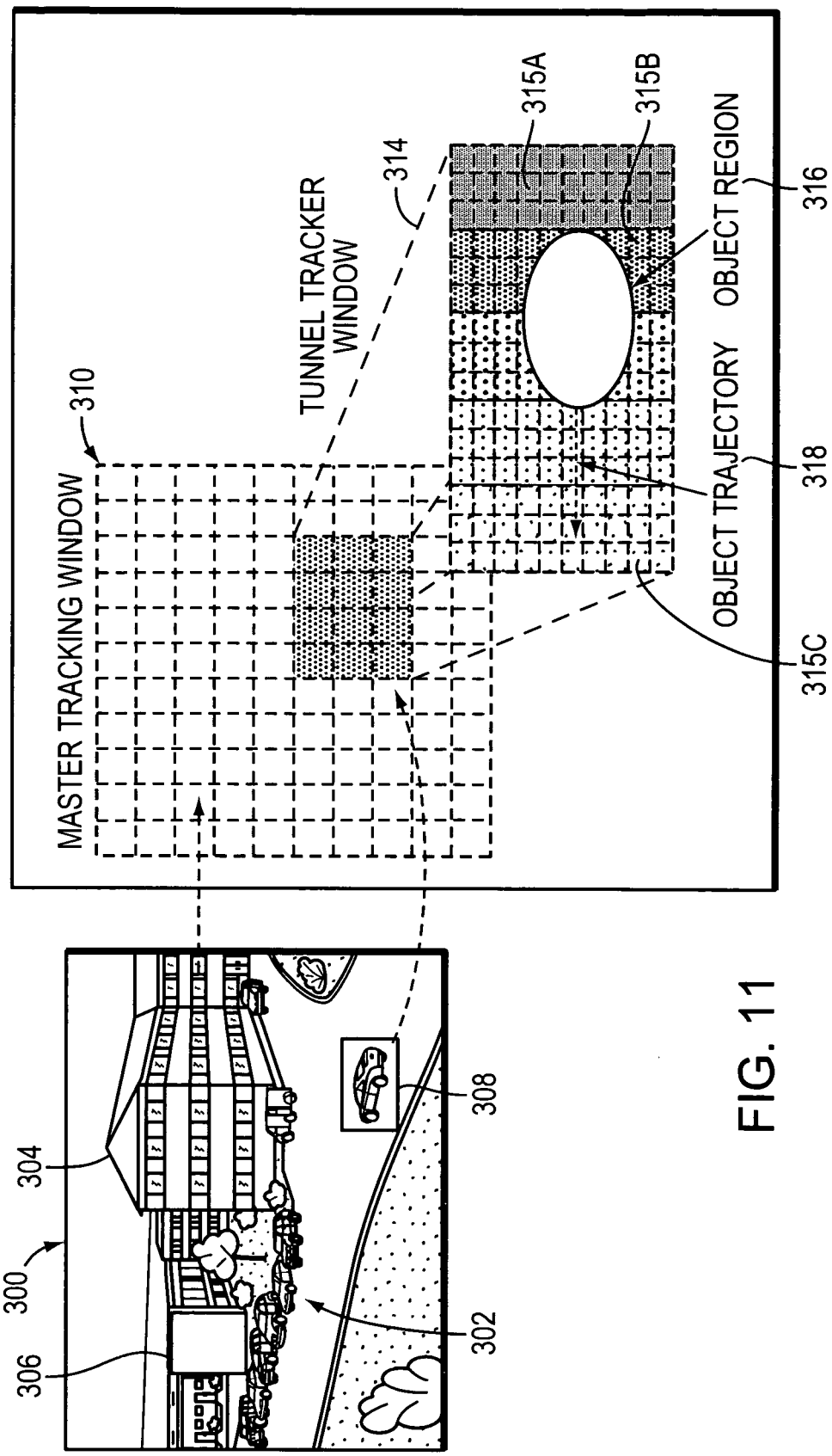
FIG. 11 illustrates operation of the peripheral master tracker and the tunnel tracker.
Figure 11A:
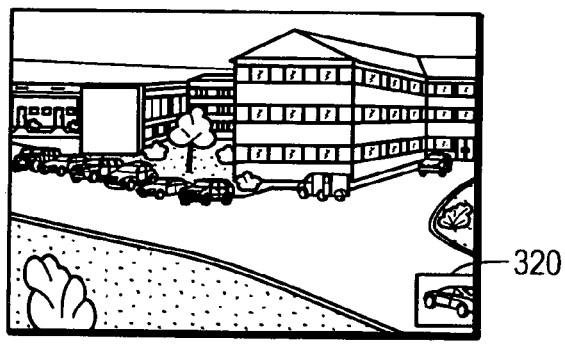
FIGS. 11A through 11E illustrate a scene with a tracked object.

As illustrated in FIG. 11, master peripheral tracker 44 is responsible for generally viewing a scene 300 and maintaining a quick glance of the scene. Master peripheral tracker 44 functions as a coordinator and an abstracted positional tracker using only condensed object information and relying partially on detailed object information generated by tunnel trackers (46A, 46B, 46C ... ) or attentional task layers to manage the overall tracking dynamics of a scene. The vision tunnels (46A, 46B, 46C ... ) are responsible for detailed object analysis. Each tunnel "sees" an object (e.g., a car 308 in FIG. 11) in a constrained small area 316 (halo) around the object. Halo 316 is the buffer area around tracked object (e.g., car 308) and is maintained by peripheral tracker 44 based on the object's current trajectory, size and location. The volume formed by the collection of these halos in consecutive frames for a single object forms a visual tunnel for each object in the video. Within each visual tunnel a set of object features based on the color, texture and edge information of the object are extracted. The best matching features are selected and used dynamically for most reliable identification and modeling of objects.

Figure 3:
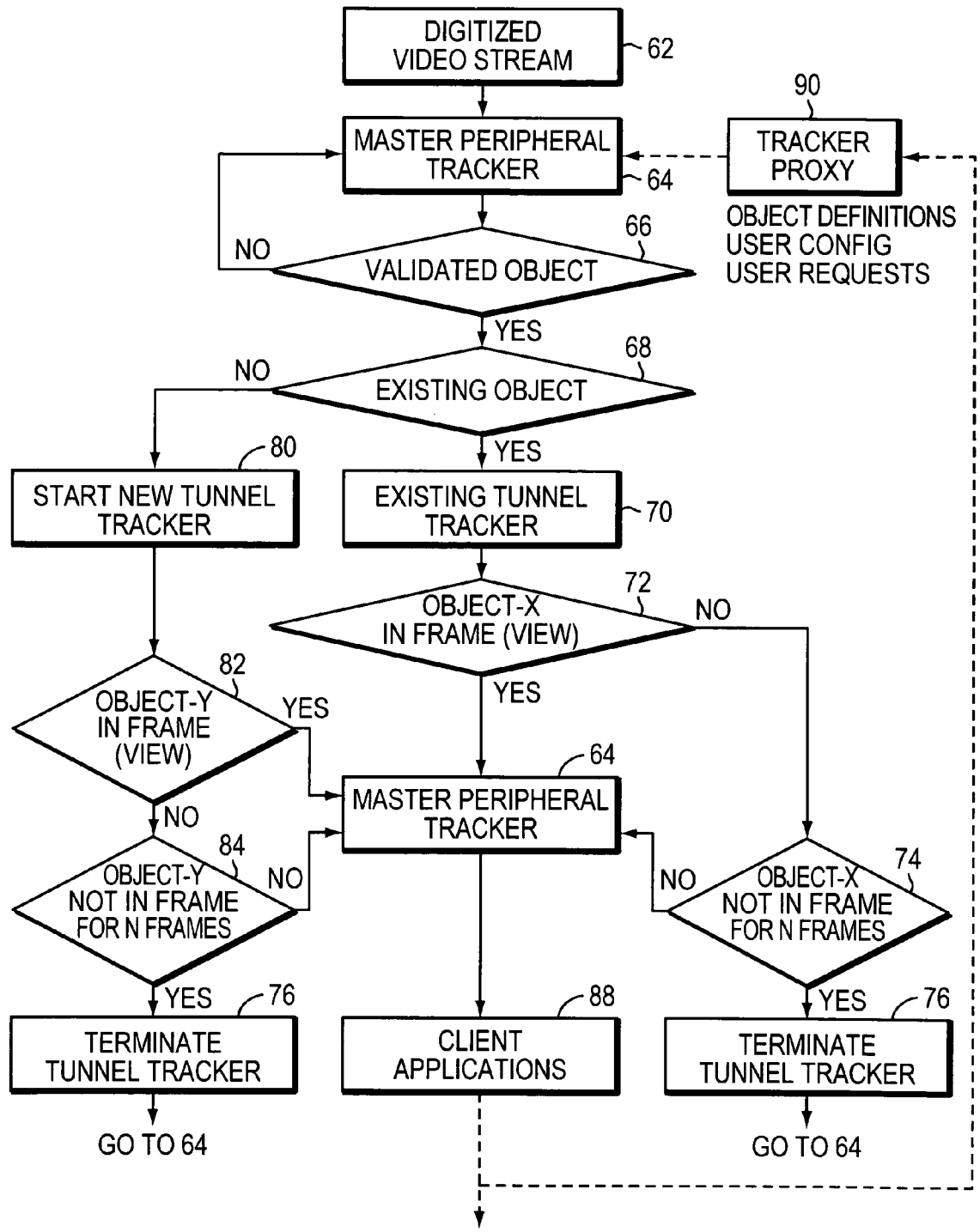
FIG. 3 is a flow diagram illustrating the operation of the video tracking system of FIG. 2.

FIG. 3 illustrates the overall operation of the video tracking system of FIG. 2. In step 62, a digitized video stream is provided to master peripheral tracker 44 in step 64. When peripheral (master) tracker 44 detects one or more new objects appearing in a scene (steps 66, 68), it triggers in step 80 a new tunnel tracker 46, wherein one tunnel tracker is dedicated for each object. Each tunnel tracker (block 70 or block 80) checks for its dedicated object for a number of successive frames (steps 72 and 74, or steps 82 and 84). The initiated tunnel trackers are terminated (step 76) if the object is no longer detected by the peripheral tracker in several frames.

Figure 4:
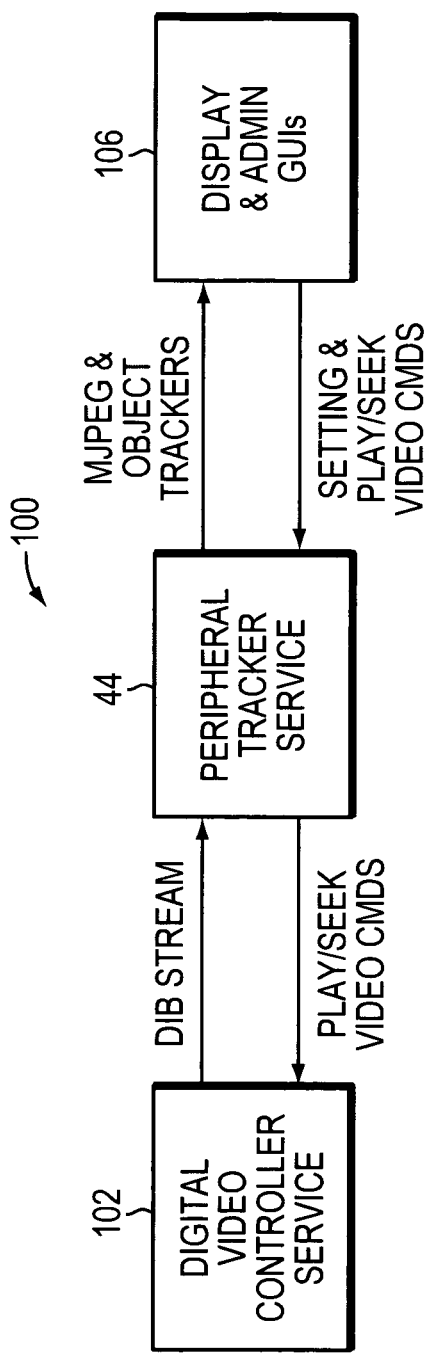
FIG. 4 is a block diagram that illustrates the operation of the video tracking system.
Figure 5:
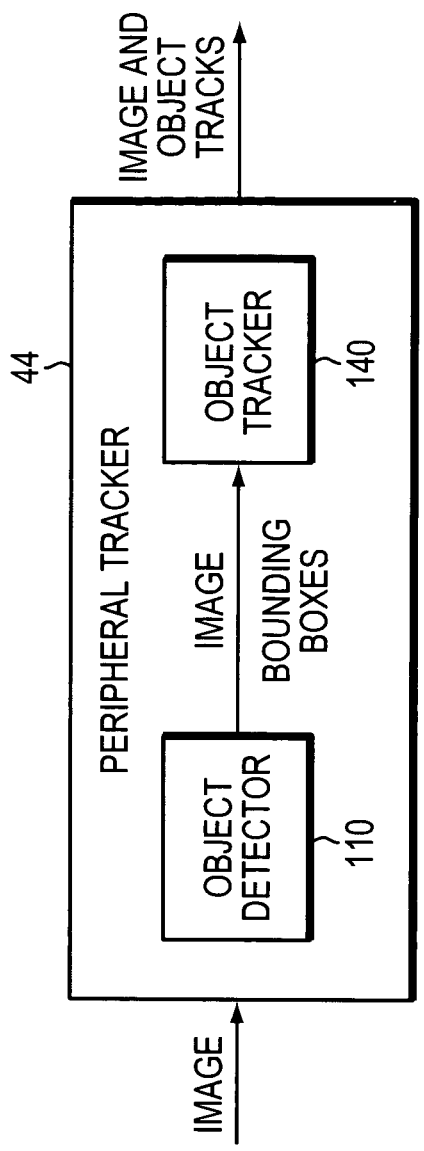
FIG. 5 illustrates diagrammatically a peripheral tracker used in the video tracking system.

FIG. 4 is a block diagram that illustrates the operation of the video tracking system. FIG. 5 illustrates diagrammatically a peripheral tracker used in the video tracking system 40. Peripheral tracker 44 (i.e., a master tracker) includes an object detector 110 and an object tracker 140. Object Detector 110 detects moving objects using a motion history image (MHI) created by a fading temporal window of N frames. Object tracker 140 tracks the moving objects detected by object detector 110 sequentially from frame to frame by building special correspondences.

The peripheral tracker's main function is to detect spatial changes in the overall scene and hence detect moving objects. Once detected the peripheral tracker initiates a tunnel tracker for that object and continues to coarsely track the object as long as it moves providing the location information for the tunnel tracker at each frame. When a moving object becomes stationary, a static object detector 380 (shown FIG. 10) is initiated. The peripheral tracker may also maintain a background image for the entire scene by starting with the first frame image and periodically updating the pixels where no objects are detected. Over time this background image will provide a depiction of the scene without any moving objects present.

Figure 6:
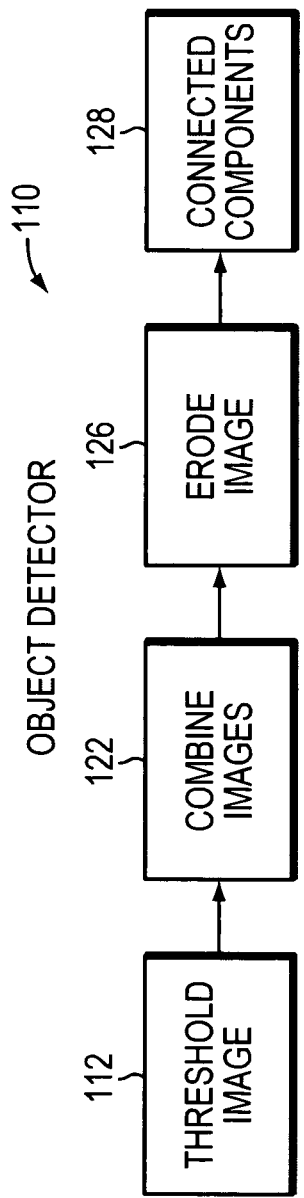
FIGS. 6 and 6A illustrate an object detector used in the peripheral tracker shown in FIG. 5.
Figure 6A:
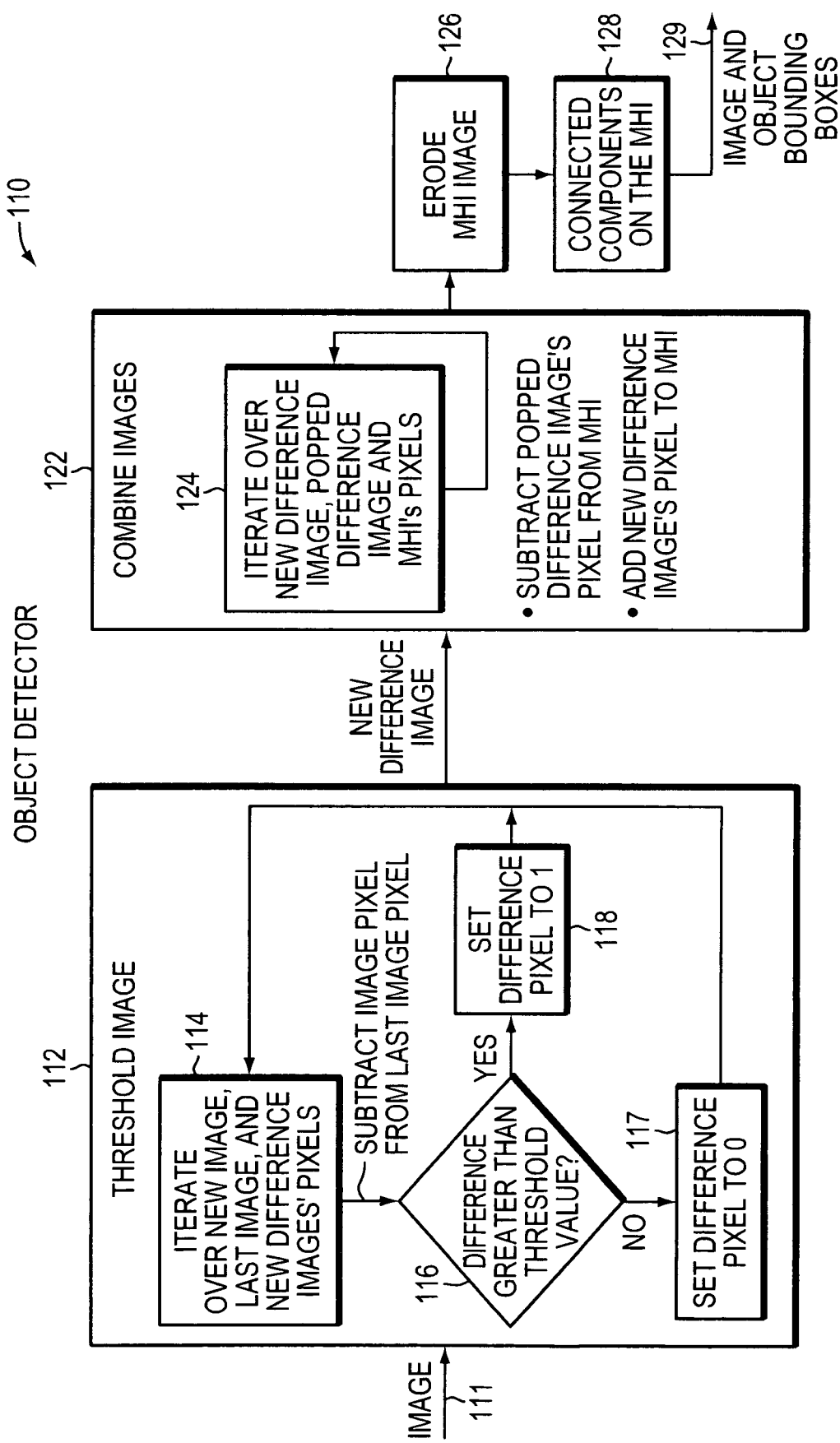

FIGS. 6 and 6A illustrate an object detector 110 used in the peripheral tracker shown in FIG. 5. Object detector 110 includes the following algorithms: Threshold Image 112, Combine Image 122, Erode Image 126, and Connected Components 128. Object Detector 110 detects moving objects using a Motion History Image (MHI) created by a fading temporal window of N frames. Then Object Tracker 140 tracks the moving objects detected by Object Detector 110 from frame to frame by building spatial correspondences.

Referring to FIG. 6A, Object Detector 110 uses the following structures:
Let q0 be a circular queue of binary images with capacity c
If q0 is not full then create a new binary image and assign it to the difference image d0
If q0 is full then assign q0[c-1] to difference image d0
Save the current color image f0 to the last color image f1
FIG. 6A illustrates Threshold Image algorithm 112, which is as follows:
Let t equal thesholdvalue ~25.
Let i equal increment value of 255/c.
Iterate through f0, f1 and d0:
Calculate the delta Δ between f0, f1 (in step 114) as follows:

$\Delta = (f0.red - f1.red)2 + (f0.green - f1.green)2 + (f0.blue - f1.blue)2$ if $\Delta > t$ than $d0 = I$ else $d0 = 0$ (steps 116, 117, 118)

Push d0 into q0
Set d1 to q0[c](popped image)
The new difference image is processed by Combine Image algorithm 122, which is as follows:
Iterate through Motion History Image h0, d0, d1:

if ($h0 > 0$) than $h0 -= d1$ if ($h0 < 255$) than $h0 += d0$

Then, Erode Image 126 erodes h0 storing result in e0, and performs connected components on e0 and return regions in algorithm 128. Object detector 110 provides image and object bounding boxes to object tracker 140.

Object detector 110 detects moving objects using a Motion History Image created by a windowed sequence of consecutive frame differences as explained below. We use the following notation:
Motion History Window Size: N
Motion History Image (at frame i): Mi is an N-level image, with Level-N indicating pixels that have changed N times within the N frame window, Level-(N-1) denoting pixels that have changed (N-1) times, so and so forth, and level-0 indicating pixels with no change within the temporal window of N frames.
Current Frame : Fi
Previous Frame: Fi-1
Frame Difference between the current and previous frames is denoted by: Fi−Fi-1 and is calculated by corresponding color channel pixel (squared) differences in Red, Green and Blue channels:

$Fi - Fi\text{-}1 = (Fi.red - Fi\text{-}1.red)^2 + (Fi.green - Fi\text{-}1.green)^2 + (Fi.blue - Fi\text{-}1.blue)^2$ The Current Difference Image Di is a binary image obtained by thresholding the Frame Difference Fi−Fi-1 as follows:

if $(Fi - Fi\text{-}1)x,y > t$ than $(Di)x,y = 1$ else $(Di)x,y = 0$

The Difference images Di's for the N most recent frames are maintained in a queue and used to calculate the Motion History Image (MHI).

Motion History Image at current frame i, Mi is then obtained as follows:

If $(Mi)x,y<N$ Adding the effect of "most recently changed" pixels $(Mi)x,y=(Mi)x,y+(Di)x,y$ based on current frame difference Di If $(Mi)x,y>0$ Eliminating the effect of "least recently changed" pixels $(Mi)x,y=(Mi)x,y-(Di-N)x,y$ based on (i-N)th frame difference Di-N Motion History Image (MHI) thus created is then filtered by a morphological "erode" operation to eliminate isolated pixels that might have been detected spuriously and break weak pixel links.

As the last step of the Object Detection the filtered Motion History Image undergoes a "connected components" operation to form connected regions from pixels which changed most recently and most frequently. These pixels are the ones that correspond to the moving object regions. The result of the connected components operation is a binary image with 0 pixels denoting the background and the 1 region denoting the moving object regions. The next step of the Peripheral Tracker is to "track" these detected moving object regions and provide these regions to tunnels over a sequence of frames as the objects move within the scene.

Figure 7:
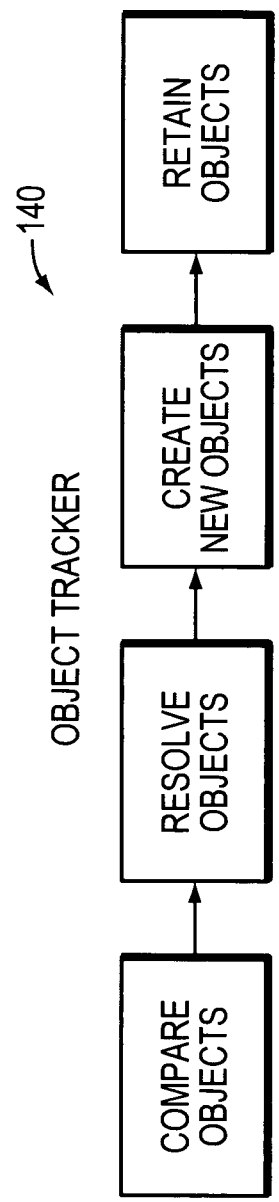
FIGS. 7 and 7A illustrate an object tracker used in the peripheral tracker shown in FIG. 5.
Figure 7A:
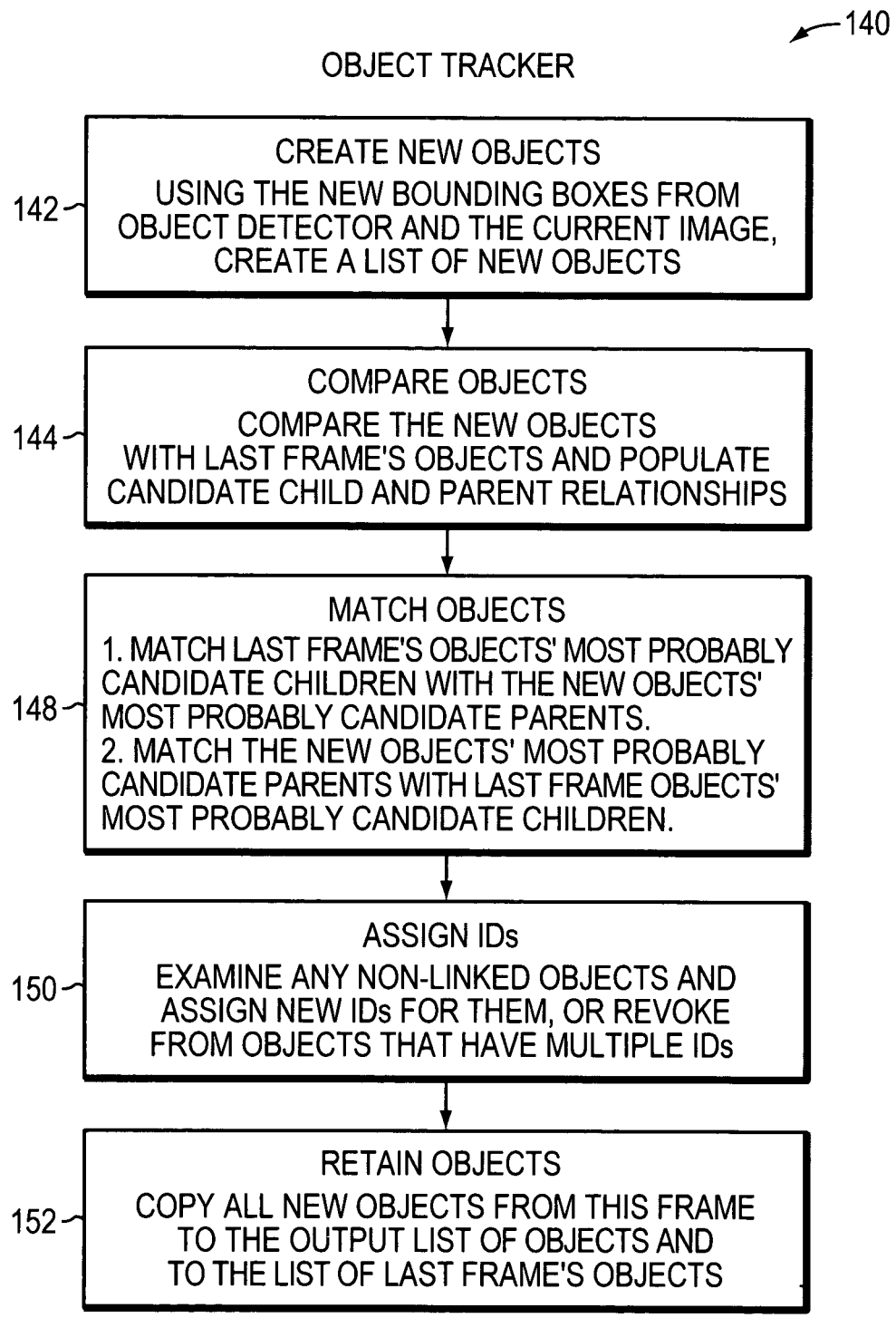

FIGS. 7 and 7A illustrate an object tracker used in the peripheral tracker shown in FIG. 5. Object tracker 140 tracks moving objects detected by object detector 140 from frame to frame by building correspondences for objects based on their motion, position and condensed color information. Object tracker 140 module has five major components: Create New Objects 142, Compare Objects 144, Match Objects 148, Assign Identifications 150, and Retain Objects 152.

Referring still to FIG. 7A, create new objects 142 create new objects using the new bounding boxes from object detector 110 and the current image. Then it creates a list of the new objects. Compare objects 144 compares the new objects with last frame's objects and populates candidate child and parent relationships. Match objects 148 performs two major functions. First, match objects 148 matches last frame's objects' most probable candidate children with the new objects' most probable candidate parents. Then, it matches the new objects' most probable candidate parents with last frame objects' most probable candidate children. Assign identifications 150 examines any non-linked objects and assigns new IDs for such objects, or revokes IDs from objects that have multiple IDs. Retain objects 152 copies all new objects from this frame to the output list of objects and to the list of last frame's objects.

When peripheral master tracker 44 detects one or more new objects appearing in a scene, it triggers one or several highly focused tunnel trackers at the second layer 46A, 46B, 46C, . . . , wherein there is one tunnel tracker dedicated for each detected object. Tunnel tracker 46 can execute different algorithms (only in the tunnel region) such as an edge-based polygon foreground-background (object) segmentation and tracking algorithm 200, or a color kernel density based foreground-background (object) segmentation and tracking algorithm 240, or a background subtraction based foreground-background (object) segmentation algorithm.

Figure 8:
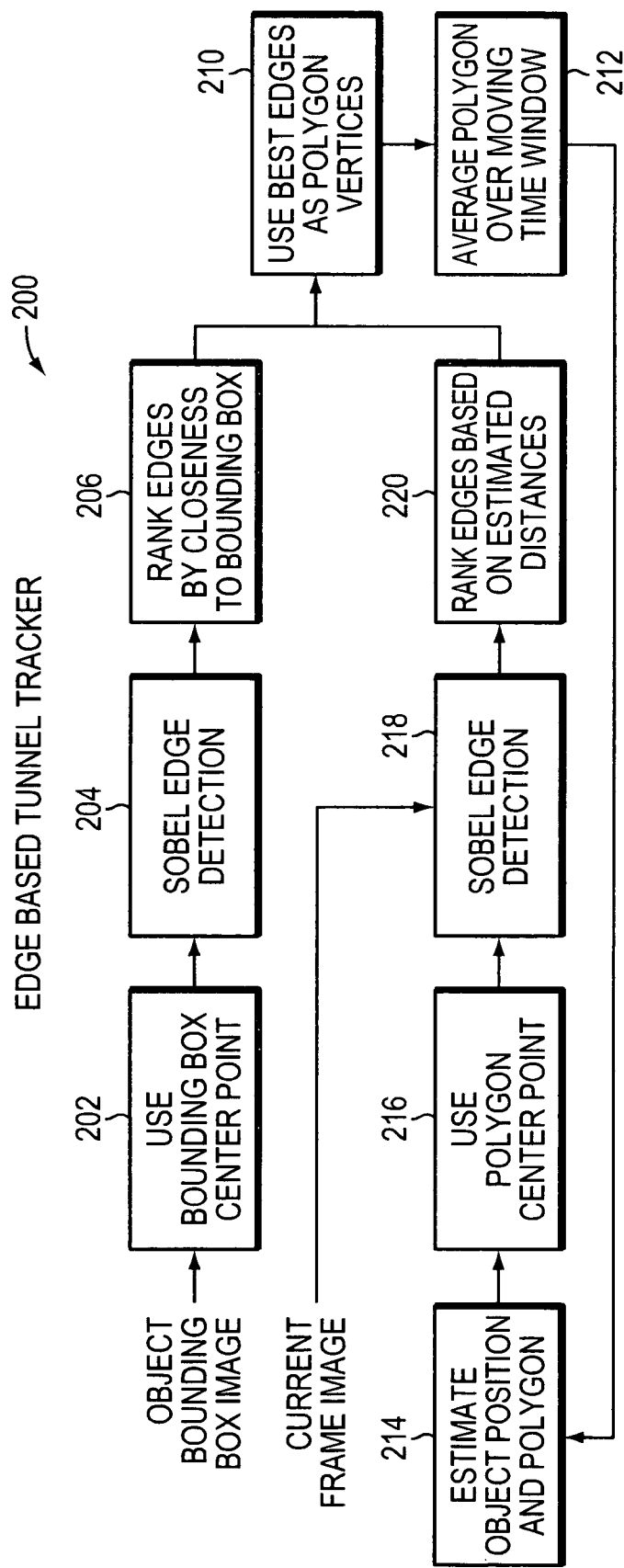
FIGS. 8, 8A, and 8B illustrate diagrammatically operation of a first embodiment of a tunnel tracker used in the video tracking system shown in FIG. 2.
Figure 8B:
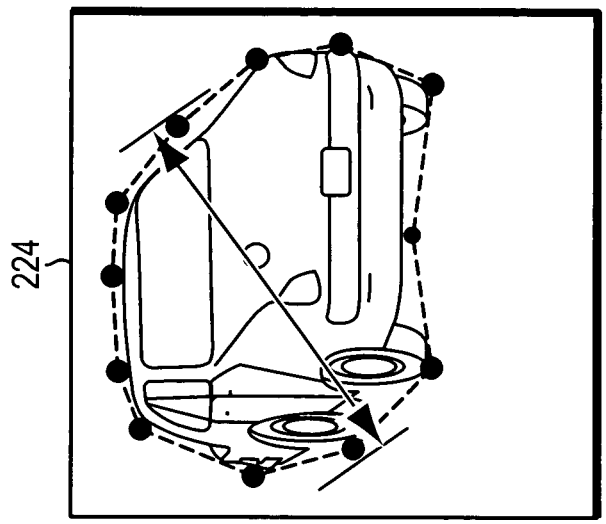
Figure 8A:
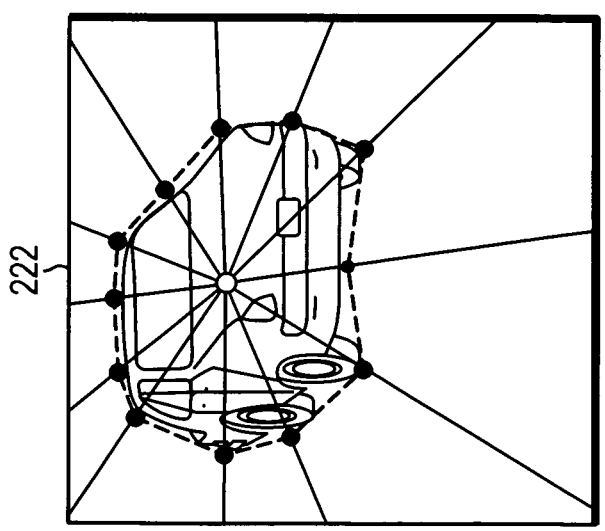

FIGS. 8, 8A, and 8B illustrate diagrammatically operation of a first embodiment of a tunnel tracker algorithm used in video tracking system 40. Edge-based polygon foreground-background (object) segmentation and tracking algorithm is summarized in FIG. 8. Edge-based polygon tracking 200 tracking objects by detecting their edges at equal intervals around the object polygon 222. In summary, the algorithm performs a two step process: (1) Edge polygon initializing wherein peripheral tracker 44 supplies the best fit edge polygon within a training bounding-box. (2) Frame to frame processing, wherein polygon edges near estimated object location are found. The edges closest to the boundary of the box are chosen to be the edges of the training object. The edges found at equal angle (for example, 30°) increments are used to create an object polygon, as shown in FIG. 8A. Object polygons are smoothed with a moving window average.

The video frames are processed as they arrive in real-time. The moving window average is used to estimate the center and dimensions of the object polygon in each new frame. The edges found at equal angle increments are stored in a sorted list. Referring to FIG. 8B, line segments are created for corresponding edge points for object length measurement (e.g. 0°-180° and 30°-210°). The point lists are searched for a point pair matching the expected length from the last frame object instance. The resulting points are used to construct the new object for the current frame. Then, the center of the new polygon is checked against the estimated center. If new and old center points are close, the new polygon is used. If they are not, a local search and optimization is performed.

The local search and optimization is executed by repeating the process with four new center points, each slightly offset from the projected center. Then, the polygon that gives a center closest to the projected center is used and is added to the moving window average.

Referring to FIG. 8, tunnel tracker 46 receives the object bounding box from peripheral tracker 44. The algorithm uses the bounding box center point (202), performs the sobel edge point detection (204), and then ranks edges by the closeness to the bounding box (206). The algorithm uses the best edges and polygon vertices (210). The algorithm estimates a new frame's object center point based on the moving window average of the previous frame's polygons (214). The edges are found along rays emanating from the estimated center point of the object every n degrees (for example, 30° mentioned above). The algorithm performs the sobel edge point detection (218). The algorithm ranks the detected edge points by closeness to the edge of the bounding box (220) for an existing object bounding box. For an estimated polygon, the algorithm ranks the edge points in pairs, based on the distance between the edges along opposite-angled rays.

Figure 9:
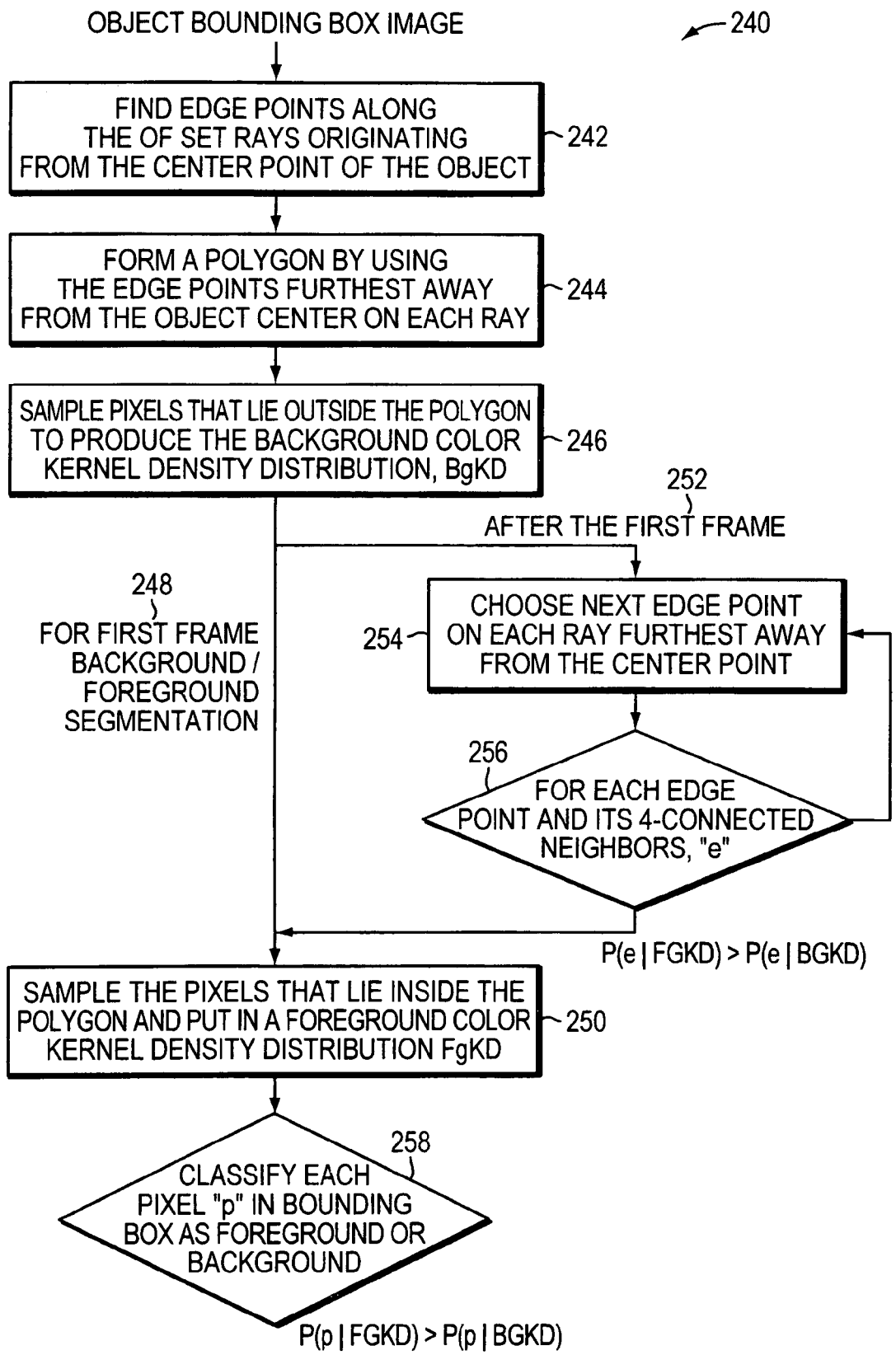
FIG. 9 illustrates diagrammatically color kernel density based foreground-background object segmentation algorithm.

FIG. 9 illustrates diagrammatically the color kernel density based foreground-background (object) segmentation and tracking algorithm 240 executed by tunnel tracker 46. To further segment the tunnel view, tunnel tracker 46 receives tunnel view (i.e., halo) from peripheral master tracker 44. Tunnel tracker 46 uses 12 rays to create a polygon representation of the object, and then uses a 3D color Kernel density function to produce an object and background segmentation in the object bounding box (tunnel view).

The algorithm 240 finds edge points along rays emanating from the center point of the object (242), and then forms a polygon using the edge points farthest away from the object center point on each ray (244). The algorithm samples the pixels that lie outside the polygon to produce the background color kernel density distribution, BgKD (246). This is done for the first frame background and foreground segmentation (248). Then, the algorithm samples the pixels that lie inside the polygon and puts in a foreground color kernel distribution FgKD(250). After the first frame, the algorithm chooses the next edge point on each ray farthest away from the object center point (254). For each edge point and its four connected neighbors "e", in step 256, if $P(e|FgKD)>P(e|BgKD)$, the algorithm samples the pixels that lie inside the polygon and puts in a foreground color kernel distribution FgKD (250). If P(e|FgKD)<P(e|BgKD), the algorithm executes step 254 again. After step 250, the algorithm classifies each pixel P in step 258 shown in FIG. 9.

Figure 9A:
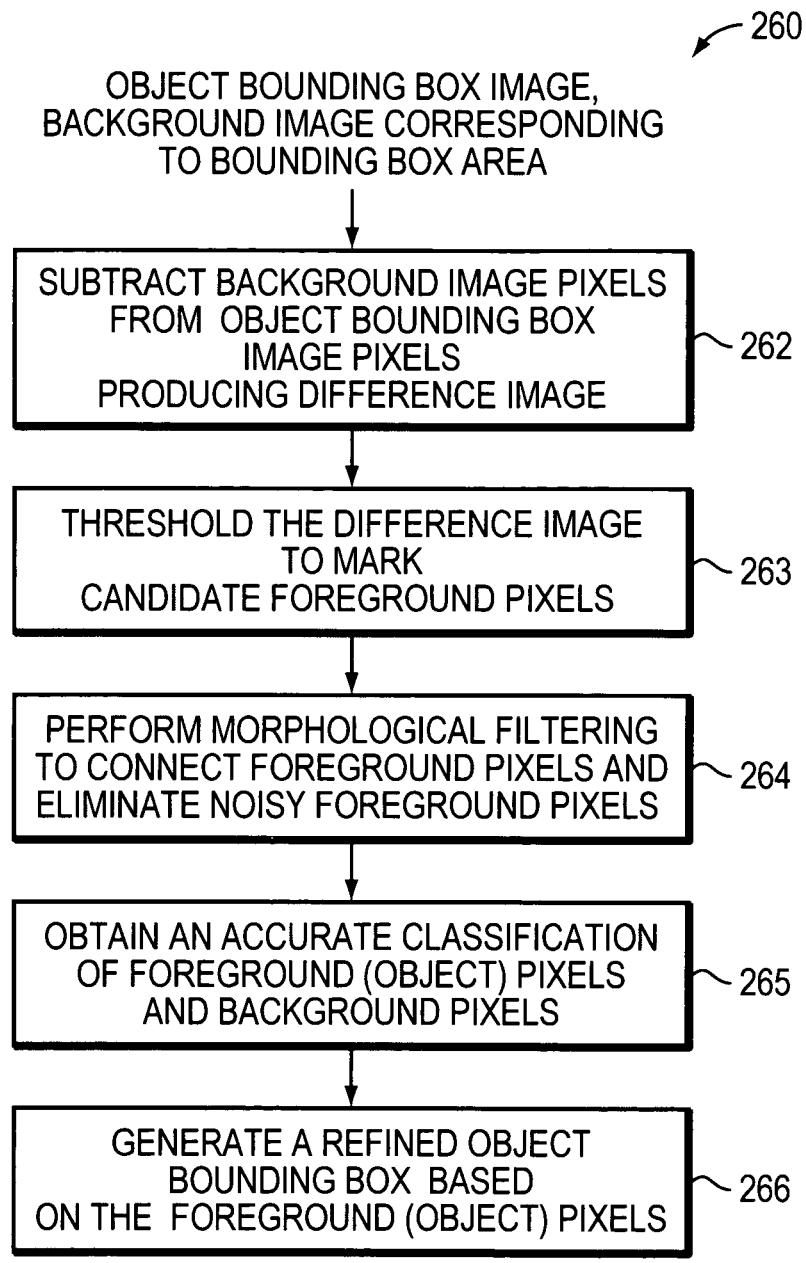
FIG. 9A illustrates diagrammatically background subtraction based foreground-background object segmentation algorithm.

Alternatively, FIG. 9A illustrates diagrammatically the background subtraction based foreground-background object segmentation algorithm 260 executed by tunnel tracker 46. To further refine the detection of the object in the tunnel view, tunnel tracker 46 receives tunnel view (i.e., halo) from peripheral master tracker 44 as well as the part of the background image that corresponds to the halo area. Tunnel tracker 46 performs a background subtraction 262 and thresholding 263 in the halo area to obtain candidate foreground object pixels and performs morphological filtering 264 (dilate and erode filters) to produce an accurate object (foreground) and background pixel classification in step 265 in the coarse object bounding box (tunnel view), shown in FIG. 9A. The accurate foreground object pixels obtained as such is used to generate a refined bounding box 266 for the object at each frame providing a more accurate track for the tracked object. This algorithm is repeated for each frame to refine the object bounding box and the track when the peripheral tracker sends the current coarse object bounding box (tunnel view) to the tunnel tracker.

Figure 10:
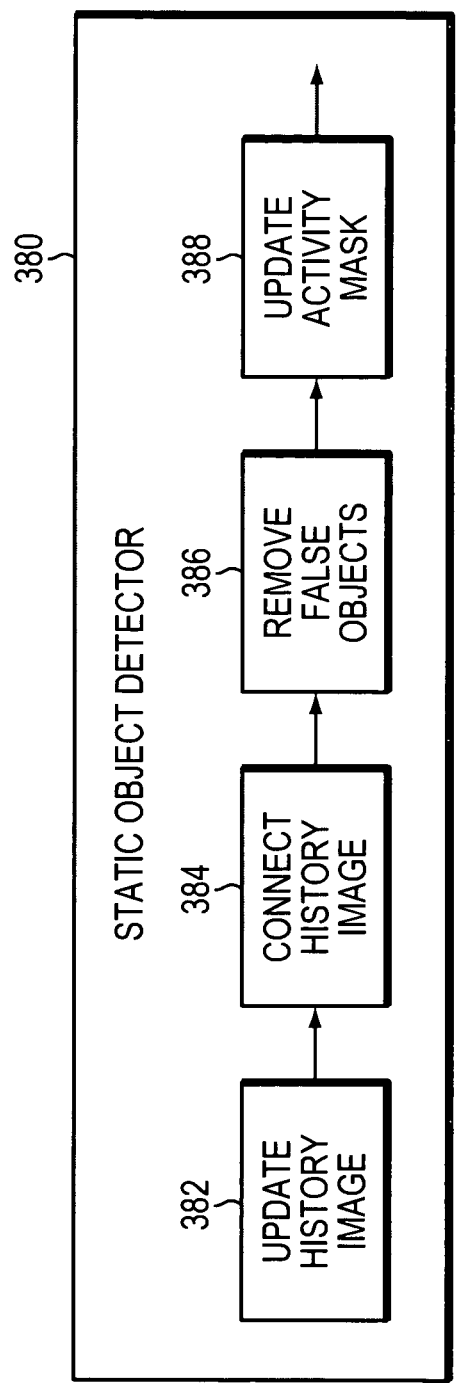
FIG. 10 illustrates diagrammatically operation of a static object detector used in the video tracking system shown in FIG. 2.

FIG. 10 illustrates diagrammatically operation of a static object detector 380, which can be used in video tracking system 40 or separately. Static object detector 380 has four major algorithms: an Update History Image 382, a Connect History Image 384, a Remove False Objects 386, and an Update Activity Mask 388.

Update History Image 382 compare current image with background using Activity Mask m. Then, it iterates through History Image. For each pixel p that is considered foreground from background comparison, the algorithm increments p by value i. For each pixel p that is considered background from background comparison, the algorithm decrements p by value i times 7.

Connect History Image 384 runs Connected Components on History Image, and then filters bounding boxes that do not meet a minimum size. The algorithm passes bounding boxes to Object Tracker Module to track the current frame, and removes duplicate static objects.

Remove False Objects 386 iterates through each object and crops the current image and background using the object's bounding box. The algorithm then uses a Sobel Edge filter on the current and background image. If the number of edge pixels in the foreground is less than the number of edge pixels in the background, the algorithm removes the object as false.

Update Activity Mask 388 saves the Peripheral Tracker's bounding boxes that were detected in the last frame to a time queue of bounding boxes of length time t. Then, the algorithm iterates through the queue:—decrementing the Activity Mask for each pixel in the bounding box that will expire; and— incrementing the Activity Mask for each pixel in the newly inserted bounding boxes. The algorithm increments the mask for each Static Object's current bounding box, and creates a binary mask from this Activity Mask used with the next background comparison in the next frame.

The background for the static object detector is calculated as follows:
  Video frames periodically sent to the background generator, along with bounding boxes of detected and suspected objects.
  The background generator incorporates the new frame, ignoring the areas deliminated by the object bounding boxes.

For each pixel, the background generator stores 5 values:
  1. Weighted average of each the red, blue and green channels of the video
  [weighted average]=([old average]*(1.0−$w$))+([new value]*$w$)
  wherein w is the user supplied update weight
  2. Combined average color (essentially 24-bit greyscale)
  [color]=[red average]*9+[green average]*18+[blue average]*3
  3. Standard deviation of the combined color
  New frames are compared to the background.
  For each pixel, a likeness value is generated. This describes how likely the given pixel is to belong to the background.
  The likeness is generated based on how many standard deviations apart the back-ground average and new frame's color are.
  [likeness]=1/([diff]/[stdev])$^2$
  wherein—differences less than 1 standard deviation from the average have a 1.0 likeness (100% likely to be the background)
  differences greater than 10 standard deviations from the average have a 0.0 like-ness (0% likely to be in the background)

The Perimeter Event algorithm executes the following algorithm:
  User designates a perimeter zone.
  Objects are allowed to be outside the zone, or to appear inside the zone and stay there.
  If any object moves from outside of the zone to inside the zone, it triggers an alarm as long as it stays within the zone.
  "Inside" and "outside" is determined by the percentage of an object's bounding box contained by the zone. As defined: "Inside" if [overlap]/[bounding box area]>p; where p is a percentage supplied by the user.

FIG. 11 illustrates operation of the peripheral master tracker and the tunnel tracker. As described above, the video tracking system 40 utilizes a two layer tracking paradigm with peripheral master tracker 40 at the high level that detecting new objects (e.g., a car 308) appearing in a scene 300 and triggering low level highly focused tunnel trackers dedicated to refined detection and analysis of the individual objects. The peripheral master tracker may employ frame differencing with Motion History Image as described above or background subtraction to perform object detection at each frame. Tunnel trackers (46A, 46B, 46C . . . ) refine the detection of an object in a constrained small tunnel area (a halo 316) around the object. The halo is the buffer area around the tracked object that is formed by the peripheral tracker based on the object's current trajectory, size and location. The volume formed by the collection of all halo areas in each frame for a single object forms a visual tunnel. The halo may be a rectangular area, or a circular area, or an ellipsoidal area. Each tunnel tracker 46 builds the background area in the 'halo' around the object as the object moves through the view. In consecutive frames, due to overlapping halo regions, the background pixels with most statistical samples is depicted as area 315A. Towards the front of the halo area, in the direction of object motion, the statistical information on the halo pixels will decrease (i.e., an area 315C). Based on this scheme, a confidence value can be assigned to each pixel to update the master tracker's background.

Figure 12A:
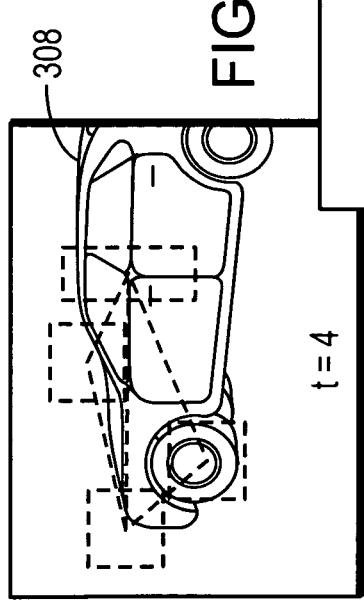
FIGS. 12A through 12C illustrate a tracked object over time.
Figure 12B:
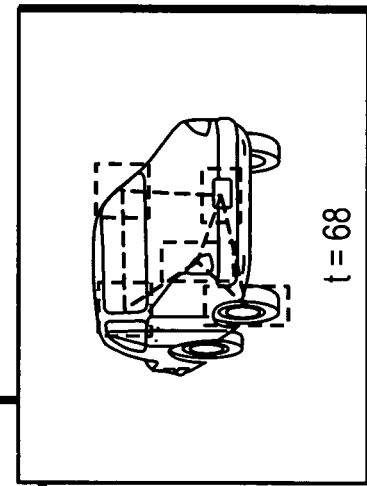
Figure 12C:
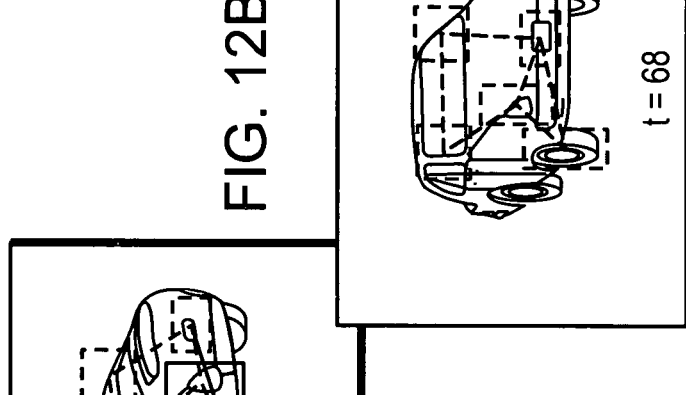
Figure 12D:
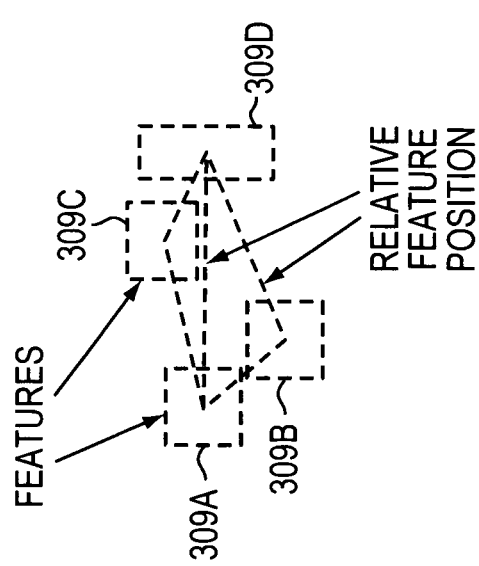
FIG. 12D illustrates selective features of the tracked and their relative positions for the object shown in FIG. 12A.

FIGS. 12A-12C illustrate the tracked object (i.e., car 308) over time. Tunnel tracker 46 extracts a set of object features based on, for example, the color, texture and edge information of the tracked object and the extended object regions. During tracking the best matching features are selected and used dynamically for most reliable identification and modeling of the objects. The texture color and edge information can be fused due to modeling of the halo region instead of modeling of just the object pixels. This provides secondary association such as assuming the tracked objects constitute the corners a polygon implementing an object feature spatial map that keeps track of the object features and their relative positions between frames. This is illustrated in FIG. 12D, where selective features 309A, 309B, 309C, and 309D are shown and tracked including their relative positions for the object shown in FIG. 12A.

Alternatively, a kernel-based tracker for this step may be used as described above. Given the small size of the halo the kernel-based approach can also be implemented very efficiently.

Figure 11B:
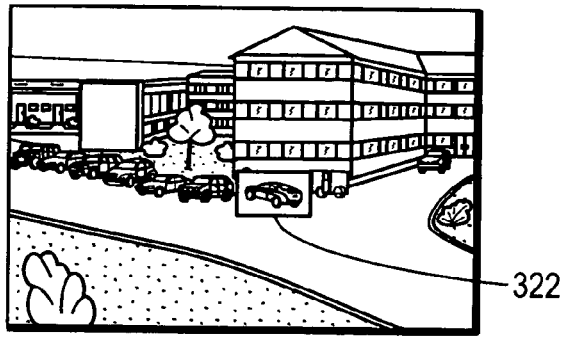
Figure 11C:
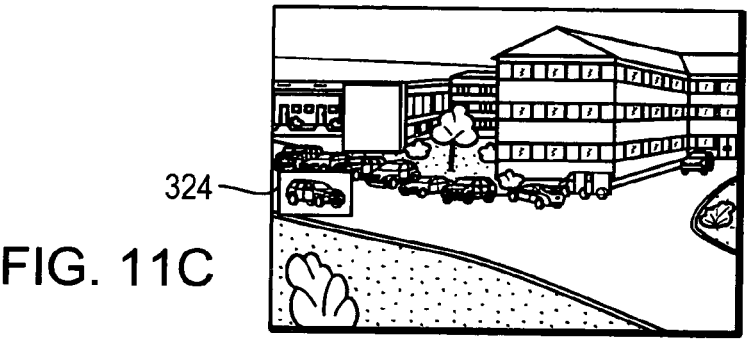
Figure 11D:
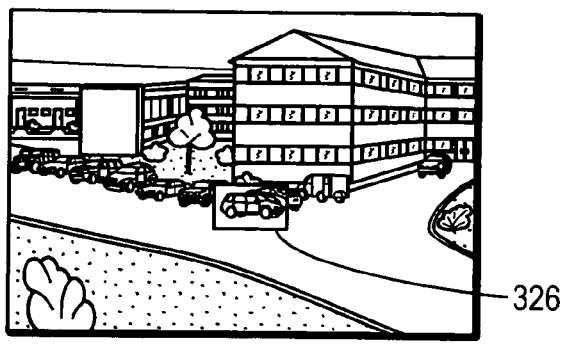
Figure 11E:
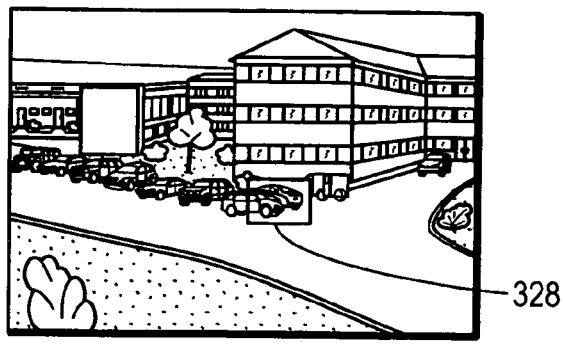

FIGS. 11A-11E illustrate a scene with a tracked object. When Peripheral master tracker 44 detects a new object of interest, a new tunnel tracker 46A is spawned, tracking only the new object (e.g., a car within a halo 320). Tunnel tracker 46A is interested in pixels within the car's projected halo, while all pixels outside of the halo are of no concern to tunnel tracker 46A. That is, tunnel tracker 46A only maintains statistics on background and object pixels in its own tunnel. However, in each tunnel, maintaining both the object pixel and the background statistics is important because all the pixels within the halo of one tunnel tracker constitute the background pixels for other tunnel trackers. Referring to FIG. 11B, as the car moves in field of view, the size of the halo changes (i.e., now shown as a halo 322 in FIG. 11B). This size is proportional to the object size (i.e., the car size in the frame) and the car position in the view. Referring to FIG. 11C, when next a new object appears (a van in halo 324), peripheral master tracker 44 detects this new object of interest, and spawns a new tunnel tracker, e.g., a tunnel tracker 46B in FIG. 2. The pixels associated with tunnel tracker 46A tracking the object in halo 322, can be ignored and considered as the background pixels for tunnel tracker 46B. Even though the second object (i.e., the van initially within halo 324) eventually occludes the first object (sedan in halo 322), as seen in FIG. 11D, the two independent tunnel trackers are maintained with different views. Peripheral master tracker 44 continues to maintain statistics and decisions on whether one or several pixels are considered object, background, or shared between the existing tunnels.

Figure 13:
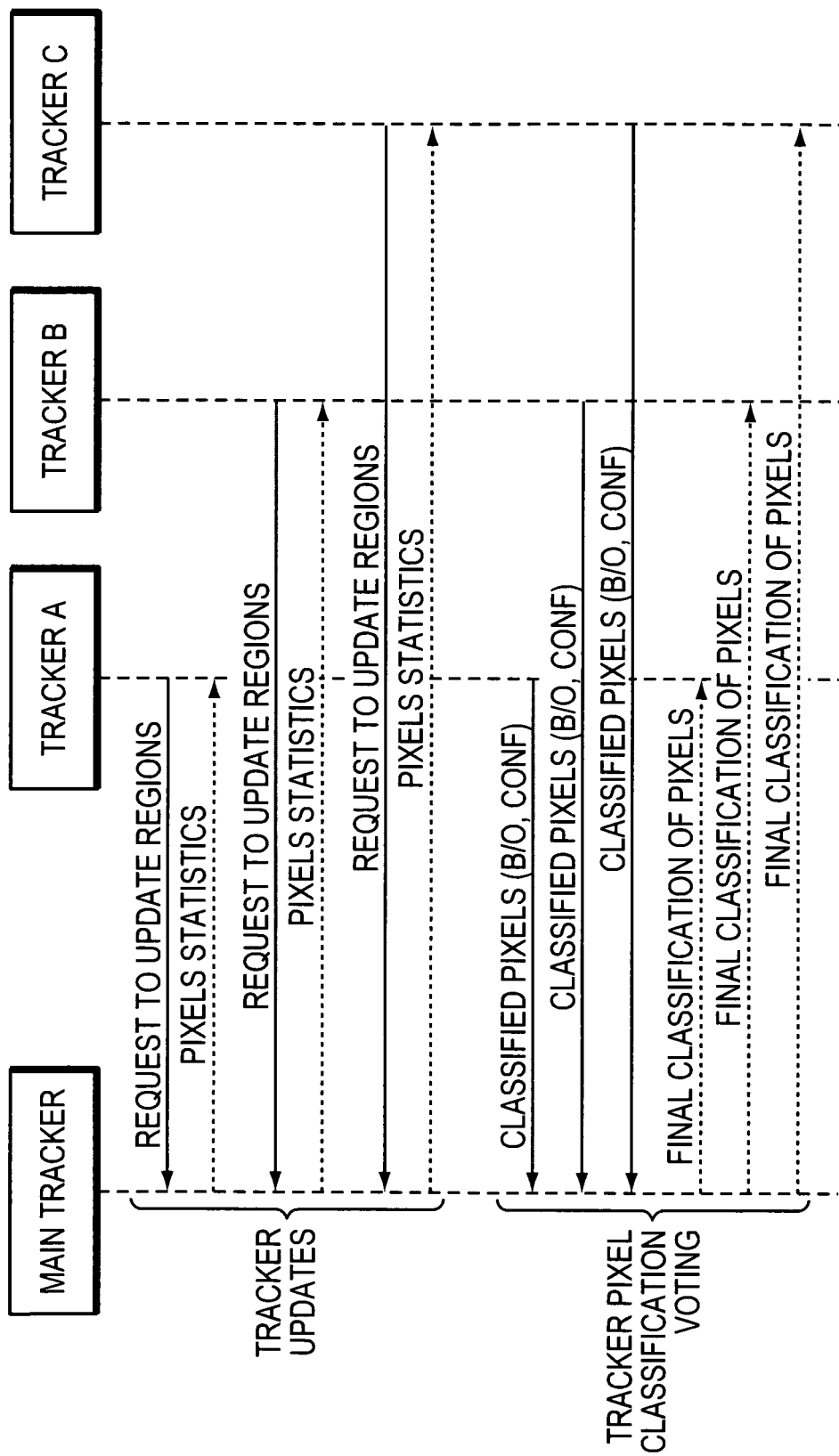
FIG. 13 illustrates video tracking and communication between a peripheral master tracker and an initiated tunnel tracker A, tracker B, and tracker C.

Peripheral master tracker 44 periodically requests the pixel statistics from all tunnel trackers (46A, 46B, 46C . . . ) to update its background. As the object in halo 322 waits (i.e., sedan shown in FIG. 11B), its background statistics become more accurate and so does the master tracker's background. In case of object occlusions, the tunnel trackers execute a vote on the classification for each pixel (or small region) within their halo using the region ID and the pixel confidence level, to determine whether a pixel is part of the background region or the object region. Peripheral master tracker 44 compiles all the results and make decisions for the final classification of each pixel, notifying the tunnels of its decision (see messaging shown in FIG. 2). Conflicting objects are resolved, for example, by using the object pixel confidence, which is the likelihood of that pixel fitting in the previously seen object models. If tunnel trackers 46A and 46B are both reporting that the same pixel as object pixel for their respective objects, the main tracker makes a decision for the higher confidence pixels, to resolve the occlusion as depicted in FIG. 13.

Peripheral master tracker 44 can also adjust the size of the halo so that an initialized tunnel tracker is not overly sensitive to sudden object motion. Furthermore, peripheral master tracker 44 can execute a separate algorithm in situations where the master tracker or the tunnel trackers are affected by cast shadows. The small image area within a tunnel tracker is usually less prone to persistent shadow regions and the variability of these regions.

The Tunnel-Vision Tracker paradigm has many possible applications, such as multi-view cameras or multi-camera environments, as well as the potential for mapping to hardware platforms. The tunnel-vision tracker presents a natural processing hierarchy for efficient mapping of tracking tasks on dedicated processors within various software and hardware architectures. It provides a natural framework for tracking within wide view cameras with embedded high-definition views or multiple camera/view environments with multiple views provided by a camera array with overlapping or non-overlapping views.

The 'abandoned object' algorithm operates by "watching" for regions which deviate from the background in an aperiodic fashion for a long time. This abandoned object detection algorithm is robust to occlusions in crowded scenes based on aperiodic persistent region detection: a stationary abandoned object will cause a region to remain different from the background for as long as that object stays in place. Moving objects occluding an abandoned object does not create a problem, as the region of the abandoned object remains different from the background, regardless of whether it is the abandoned object or a moving object in the foreground. The algorithm takes into account lots of other moving objects causing occlusion of the abandoned object. The 'abandoned object' algorithm can be implemented as a standalone application, or as part of the video tracking system 40.

In addition, it will be understood by those skilled in the relevant art that control and data flows between and among functional elements and various data structures may vary in many ways from the control and data flows described above. More particularly, intermediary functional elements (not shown) may direct control or data flows, and the functions of various elements may be combined, divided, or otherwise rearranged to allow parallel processing or for other reasons. Also, intermediate data structures or files may be used and various described data structures or files may be combined or otherwise arranged. Numerous other embodiments, and modifications thereof, are contemplated as falling within the scope of the present invention as defined by appended claims and equivalents thereto.

What is claimed is:

1. A video tracking system, comprising:
  a processor designed to execute layered processing comprising:
    a master peripheral tracker operative to interact with frames of image data, said master peripheral tracker including logic to monitor a scene and to detect an object within said frames of image data using a motion history image algorithm utilizing a windowed sequence of consecutive frame differences; and
    a first tunnel tracker initiated by said master peripheral tracker, said first tunnel tracker including logic dedicated to track one said detected object, located within a first buffer area, utilizing a first portion of said image data frame-by-frame by building correspondences for said tracked object based on its attributes, said first buffer area being formed by said master peripheral tracker based on said tracked object's current trajectory, size and location.

2. The video tracking system of claim 1 further including a second tunnel tracker initiated by said master peripheral tracker after detecting a second object within said frames of image data using said motion history image algorithm, said second tunnel tracker including logic dedicated to track said second detected object, located within a second buffer area, utilizing a second portion of said image data frame-by-frame by building correspondences for said second tracked object based on its attributes, said second buffer area being formed by said master peripheral tracker based on said second tracked object's current trajectory, size and location.

3. The video tracking system of claim 2 further including a third tunnel tracker initiated by said master peripheral tracker after detecting a third object within said frames of image data using said motion history image algorithm, said third tunnel tracker including logic dedicated to track said third detected object, located within a third buffer area, utilizing a third portion of said image data frame-by-frame by building correspondences for said third tracked object based on its attributes, said third buffer area being formed by said master peripheral tracker based on said third tracked object's current trajectory, size and location.

4. The video tracking system of claim 1 further including a digital video controller constructed and arranged to receive image data.

5. The video tracking system of claim 1 further including a tracker proxy for communicating with said master peripheral tracker and client applications.

6. The video tracking system of claim 1, wherein said master peripheral tracker includes an object detector and an object tracker.

7. The video tracking system of claim 1, wherein said tunnel tracker executes an edge based tunnel tracking algorithm.

8. The video tracking system of claim 1, wherein said tunnel tracker executes a Kernel based tunnel tracking algorithm.

9. The video tracking system of claim 1, wherein said tunnel tracker executes a Background subtraction based tunnel tracking algorithm.

10. A video tracking method executed by layered processing using a processor, comprising:
monitoring a scene and detecting an object using a master peripheral tracker using a motion history image algorithm utilizing a windowed sequence of consecutive frame differences; and
initiating by said master peripheral tracker a first tunnel tracker dedicated to track one said detected object, located within a first buffer area, utilizing a first portion of video data frame-by-frame by building correspondences for said first tracked object based on its attributes, wherein said first buffer area is provided by said master peripheral tracker.

11. The video tracking method of claim 10 further including initiating by said master peripheral tracker a second tunnel tracker dedicated to track one said detected object, located within a second buffer area, utilizing a second portion of said video data frame-by-frame by building correspondences for said second tracked object based on its attributes wherein said second buffer area is provided by said master peripheral tracker maintaining said first buffer area and said second buffer area co-dependently.

12. The video tracking method of claim 11 wherein said processing by said processor includes processing by a graphics processing unit.

13. The video tracking method of claim 11 wherein said processing by said processor includes processing by a digital signal processor.

14. The video tracking method of claim 11 wherein said processing by said processor includes processing by an ASIC.

15. The video tracking method of claim 10 wherein said master peripheral tracker sends image requests to a digital video controller.

16. The video tracking method of claim 15 wherein said master peripheral tracker and said digital video controller exchange image data streams and notification messages.

17. The video tracking method of claim 10 wherein said master peripheral tracker provides assembled tracking images to a tracker proxy that communicates with client applications.

18. A server executable embodied on a non-transitory computer readable medium for execution by a processor associated with a video tracking system comprising:
monitoring a scene and detecting an a first object using a master peripheral tracker, said first object being detected within said scene;
initiating by said master peripheral tracker a first tunnel tracker dedicated to track one said first detected object, located within a first buffer area, utilizing a first portion of video data frame-by-frame by building correspondences for said first tracked object based on its attributes; and
initiating by said master peripheral tracker a second tunnel tracker dedicated to track a second detected object, located within a second buffer area, utilizing a first portion of video data frame-by-frame by building correspondences for said second tracked object based on its attributes, wherein said first buffer area and said second buffer area are provided by said master peripheral tracker maintaining said first buffer area and said second buffer area co-dependently.

19. A computer program product embodied on a non-transitory computer-readable medium and designed for providing video tracking data by video tracking system executing layered processing, comprising:
monitoring a scene and detecting an object using a master peripheral tracker using a motion history image algorithm utilizing a windowed sequence of consecutive frame differences; and
initiating by said master peripheral tracker a first tunnel tracker dedicated to track one said detected object, located within a first buffer area, utilizing a first portion of said video data frame-by-frame by building correspondences for said tracked object based on its attributes wherein said first buffer area is provided by said master peripheral tracker.

20. The server executable of claim 18 further including initiating by said master peripheral tracker a third tunnel tracker dedicated to track a third detected object, located within a third buffer area, utilizing a third portion of video data frame-by-frame by building correspondences for said third tracked object based on its attributes.

21. The server executable of claim 18 wherein said first tunnel tracker executes in a tunnel region one of the following algorithms: an edge-based polygon foreground-background segmentation algorithm, a color kernel density based foreground-background segmentation algorithm; and a background subtraction based foreground-background segmentation algorithm.

22. The computer program product of claim 19 further including initiating by said master peripheral tracker a second tunnel tracker dedicated to track a second detected object, located within a second buffer area, utilizing a second portion of video data frame-by-frame by building correspondences for said second tracked object based on its attributes.

23. The computer program product of claim 22 executable on a graphics processing unit.

24. A video camera system, comprising:
a video camera providing a digitized image data stream corresponding to frames of acquired video data;
a digital video controller; and
a graphics processing unit executing layered processing comprising a master peripheral tracker operatively interacting with said digital video controller to receive some of said frames of image data and being programmed to monitor a scene and to detect a first object in said frames of image data using a motion history image algorithm utilizing a windowed sequence of consecutive frame differences; said master peripheral tracker initiating a first tunnel tracker including logic dedicated to track said first detected object, located within a first buffer area, utilizing a first portion of said image data frame-by-frame by building correspondences for said tracked object based on its attributes, said first buffer area being formed by said master peripheral tracker based on said tracked object's current trajectory, size and location.

25. The video camera system of claim 24 wherein said master peripheral tracker detects a second object within said frames of image data using said motion history image algorithm, and initiates a second tunnel tracker including logic dedicated to track said second detected object, located within a second buffer area, utilizing a second portion of said image data frame-by-frame by building correspondences for said second tracked object based on its attributes, said second buffer area being formed by said master peripheral tracker based on said second tracked object's current trajectory, size and location.

26. The video camera system of claim 25 wherein said master peripheral tracker detects a third object within said frames of image data using said motion history image algorithm, and initiates a third tunnel tracker including logic dedicated to track said third detected object, located within a third buffer area, utilizing a third portion of said image data frame-by-frame by building correspondences for said third tracked object based on its attributes, said third buffer area being formed by said master peripheral tracker based on said third tracked object's current trajectory, size and location.

27. The video camera system of claim 25 wherein said graphics processing unit is programmed to track said first detected object in real-time.

28. The video camera system of claim 25 wherein said graphics processing unit includes a static object detector.

29. The video camera system of claim 28 wherein said static object detector executes an update history image algorithm, a connect history image algorithm, a remove false objects algorithm, and an update activity mask algorithm.

30. The video camera system of claim 25 wherein said graphics processing unit includes an abandoned object detector.

31. The video camera system of claim 25 included in a network including multiple video camera systems each including said video camera, said digital video controller and said graphics processing unit.

32. A video camera system, comprising:
a video camera providing a digitized image data stream corresponding to frames of acquired video data;
a digital video controller; and
a processor executing layered processing comprising a master peripheral tracker operatively interacting with said digital video controller to receive some said frames of image data and being programmed to monitor a scene and to detect a first object in said frames of image data using a motion history image algorithm utilizing a windowed sequence of consecutive frame differences; said master peripheral tracker initiating a first tunnel tracker including logic dedicated to track said first detected object, located within a first buffer area, utilizing a first portion of said image data frame-by-frame by building correspondences for said tracked object based on its attributes, said first buffer area being formed by said master peripheral tracker based on said tracked object's current trajectory, size and location.

33. The video camera system of claim 32 wherein master peripheral tracker detects a second object within said frames of image data using said motion history image algorithm, and initiates a second tunnel tracker including logic dedicated to track said second detected object, located within a second buffer area, utilizing a second portion of said image data frame-by-frame by building correspondences for said second tracked object based on its attributes, said second buffer area being formed by said master peripheral tracker based on said second tracked object's current trajectory, size and location.

34. The video camera system of claim 33 wherein said master peripheral tracker detects a third object within said frames of image data using said motion history image algorithm, and initiates a third tunnel tracker including logic dedicated to track said third detected object, located within a third buffer area, utilizing a third portion of said image data frame-by-frame by building correspondences for said third tracked object based on its attributes, said third buffer area being formed by said master peripheral tracker based on said third tracked object's current trajectory, size and location.

35. The video camera system of claim 32 wherein said processor is programmed to tract said first detected object in real-time.

36. The video camera system of claim 32 wherein said processor includes a static object detector.

37. The video camera system of claim 32 wherein said processor includes an abandoned object detector.

38. The video camera system of claim 32 included in a network including multiple video camera systems, wherein each said system includes said video camera, said digital video controller and said processor.

39. The video camera system of claim 32 wherein said processor includes a graphics processing unit.

40. The video camera system of claim 32 wherein said processor includes a digital signal processor.

41. The video camera system of claim 32 wherein said processor includes an ASIC.

* * * * *